(12) United States Patent
Tamura et al.

(10) Patent No.: US 12,516,505 B2
(45) Date of Patent: Jan. 6, 2026

(54) WORK MACHINE CONTROL METHOD, WORK MACHINE CONTROL PROGRAM, WORK MACHINE CONTROL SYSTEM, AND WORK MACHINE

(71) Applicant: Yanmar Holdings Co., Ltd., Osaka (JP)

(72) Inventors: Kazuki Tamura, Fukuoka (JP); Daisuke Kawaguchi, Fukuoka (JP); Ryosuke Suga, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 34 days.

(21) Appl. No.: 18/209,504

(22) Filed: Jun. 14, 2023

(65) Prior Publication Data

US 2023/0407603 A1 Dec. 21, 2023

(51) Int. Cl.
*E02F 9/26* (2006.01)
*H04N 5/268* (2006.01)
*H04N 7/18* (2006.01)
*E02F 9/22* (2006.01)

(52) U.S. Cl.
CPC ............ *E02F 9/261* (2013.01); *H04N 5/268* (2013.01); *H04N 7/181* (2013.01); *E02F 9/2228* (2013.01); *E02F 9/2285* (2013.01); *E02F 9/2292* (2013.01)

(58) Field of Classification Search
CPC ....... E02F 9/261; E02F 9/2228; E02F 9/2285; E02F 9/2292; E02F 9/26; E02F 9/2033; E02F 9/24; H04N 5/268; H04N 7/181; H04N 7/18; B60Q 9/008; B60R 1/27; B60R 21/0134; B60R 2300/105; B60R 2300/303; B60R 2300/70; B60R 2300/8093; G06T 7/10; G06V 20/52; G06V 20/56; B60Y 2200/412
USPC .......................................................... 348/148
See application file for complete search history.

(56) References Cited

U.S. PATENT DOCUMENTS

| | | | |
|---|---|---|---|
| 2015/0217691 A1* | 8/2015 | Tanuki ................... | E02F 9/261 348/148 |
| 2016/0258134 A1* | 9/2016 | Matsumoto .............. | B60R 1/26 |
| 2019/0003155 A1* | 1/2019 | Kurogi ..................... | B60R 1/28 |
| 2019/0218744 A1* | 7/2019 | Izumikawa ............. | E02F 9/264 |

FOREIGN PATENT DOCUMENTS

JP 2005138751 A * 6/2005

* cited by examiner

*Primary Examiner* — Thai Q Tran
*Assistant Examiner* — Stephen R Smith
(74) *Attorney, Agent, or Firm* — Chris Mizumoto

(57) ABSTRACT

The work machine control method includes displaying a display screen including information related to a work machine, on a display device, and switching, when a switching operation unit is operated, the display screen to be displayed on the display device, among a plurality of screens according to a switching pattern. Here, the control method further comprises changing the switching pattern according to a movement state of the work machine.

13 Claims, 15 Drawing Sheets

WORK MACHINE CONTROL METHOD, WORK MACHINE CONTROL PROGRAM, WORK MACHINE CONTROL SYSTEM, AND WORK MACHINE

CROSS-REFERENCE

This application claims foreign priority of JP2022-097349 filed Jun. 16, 2022, the disclosures of which are hereby incorporated by reference in their entirety.

TECHNICAL FIELD

The present invention relates to a work machine control method, a work machine control program, a work machine control system that are used for a work machine, and a work machine.

BACKGROUND ART

As a related technology, a work machine (construction machine) including a lower traveling body, an upper swivel body, a plurality of imaging devices installed on the upper swivel body, and a display device installed in a cab is known (see, for example, Patent Document 1). In the work machine according to the related technology, the display device simultaneously displays driving information on a driving state and an image including at least one or more of captured images captured by the plurality of imaging devices. At least one of a display position of the driving information and the captured images that are displayed can be switched in response to an operation of a single switching switch.

PRIOR ART DOCUMENT

Patent Document

Patent Document 1: WO2015/163381A1

SUMMARY OF INVENTION

Technical Problem

In the related technology described above, since the display screen switches in a predetermined order each time the single switching switch is pressed, some operators find that the operability is poor, for example, they need to press the switching switch many times until switching to the screen they want to see.

An object of the present invention is to provide a work machine control method, a work machine control program, a work machine control system, and a work machine that can improve operability.

Solution to Problem

A work machine control method according to one aspect of the present invention includes displaying a display screen including information related to a work machine, on a display device, switching the display screen to be displayed on the display device, among a plurality of screens according to a switching pattern when a switching operation unit is operated, and changing the switching pattern according to a movement state of the work machine.

A work machine control program according to one aspect of the present invention is a program that causes one or more processors to execute the above-mentioned work machine control method.

A work machine control system according to one aspect of the present invention includes a display processor and a switching processor. The display processor displays a display screen including information related to the work machine on the display device. The switching processor switches the display screen to be displayed on the display device, among a plurality of screens according to a switching pattern when a switching operation unit is operated. The switching processor changes the switching pattern according to a movement state of the work machine.

A work machine according to one aspect of the present invention includes the work machine control system and a machine body on which the display device is installed.

Advantageous Effects of Invention

According to the present invention, a work machine control method, a work machine control program, a work machine control system, and a work machine that can improve operability can be provided.

DESCRIPTION OF EMBODIMENTS

Embodiments of the present invention will be described below with reference to the accompanying drawings. The following embodiments are embodied examples of the present invention and are not intended to limit the technical scope of the present invention.

First Embodiment

[1] Overall Configuration

Figure 1:
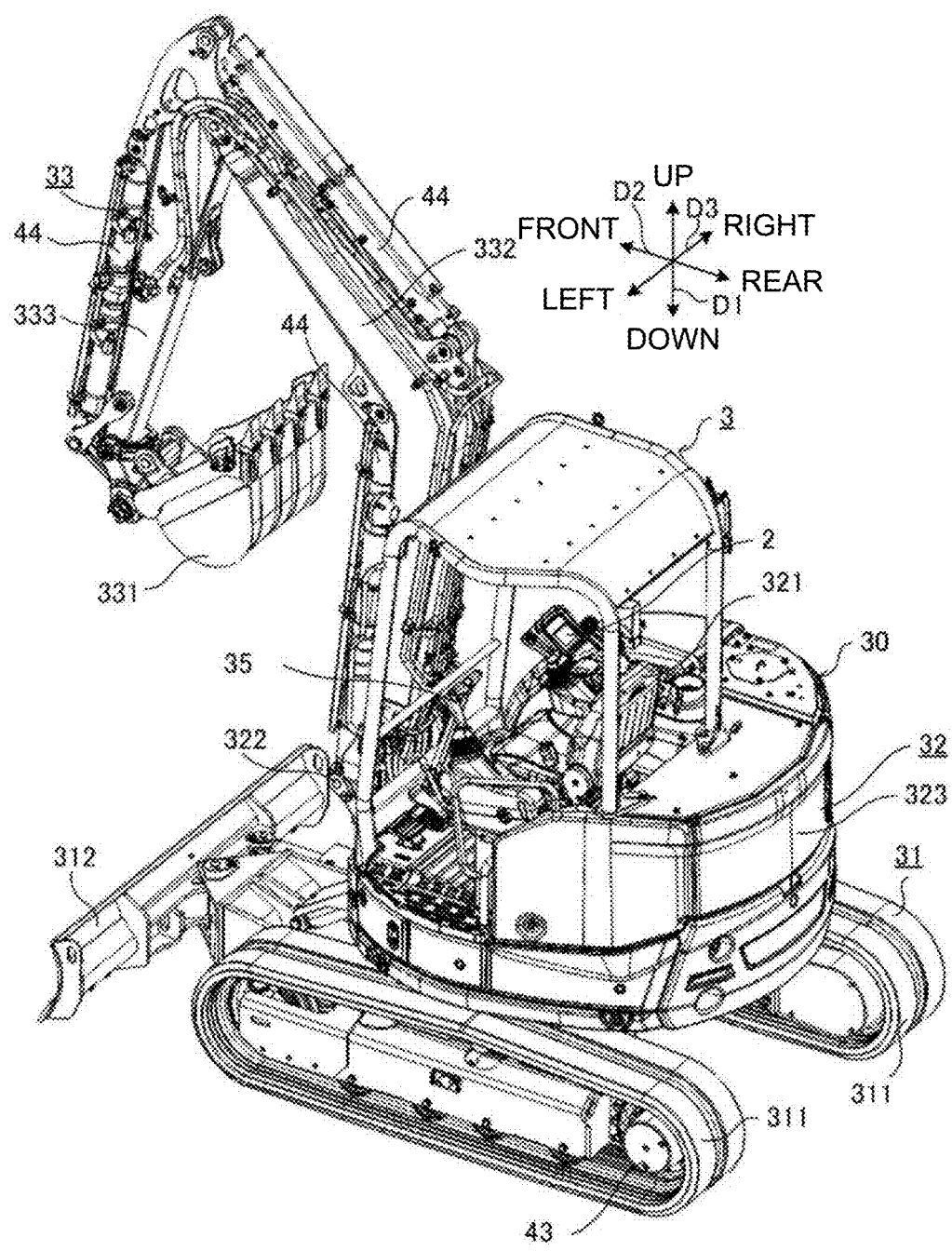
FIG. 1 is a perspective view schematically illustrating an overall configuration of a work machine according to a first embodiment.
Figure 2:
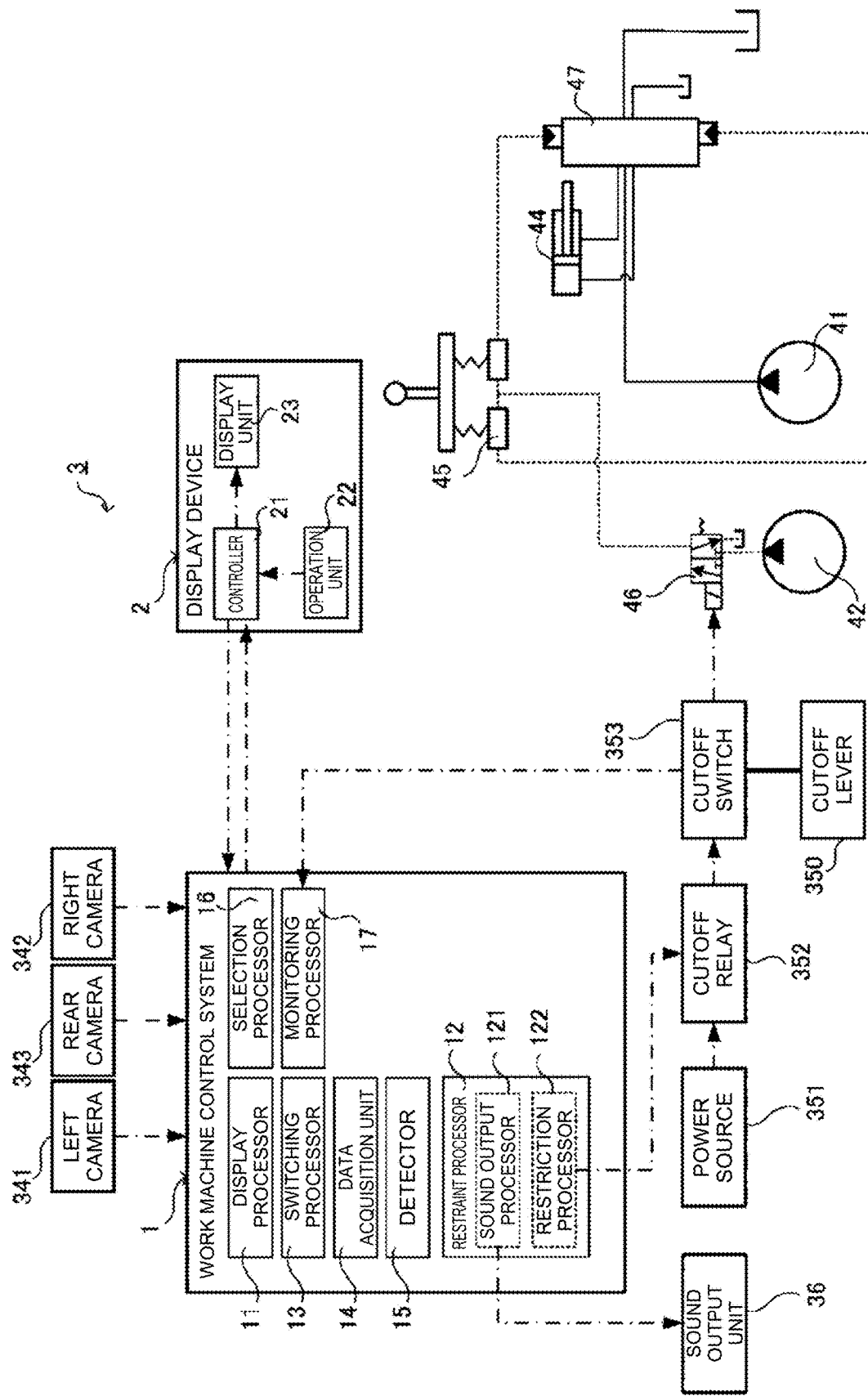
FIG. 2 is a diagram schematically illustrating a hydraulic circuit and the like of the work machine according to the first embodiment.

A work machine 3 according to the present embodiment includes a machine body 30 provided with a traveling part 31, a swivel part 32, and a work part 33, as illustrated in FIG. 1. The work machine 3 further includes a work machine control system 1 (hereinafter, simply referred to as a "control system 1"), as illustrated in FIG. 2. In addition, the machine body 30 further includes a display device 2 and an operation device 35.

The "work machine" referred to in the present disclosure refers to a machine for various types of work, and is, as an example, a work vehicle, such as a backhoe (including a hydraulic excavator and a mini excavator), a wheel loader and a carrier. The work machine 3 includes the work part 33 configured to be capable of performing one or more types of work including at least lifting work. The work machine 3 is not limited to a "vehicle" but may be, for example, a work vessel or a flying work body, such as a drone or a multicopter. Furthermore, the work machine 3 is not limited to a construction machine (construction equipment), but may also be an agricultural machine (agricultural equipment), such as a rice transplanter, a tractor, or a combine harvester. In the present embodiment, unless otherwise specified, a case where the work machine 3 is a backhoe with a lifting function (with a crane function) and can perform excavation work, ground leveling work, trenching work, or loading work as well as lifting work is taken as an example.

Moreover, for convenience of explanation, a vertical direction in a state where the work machine 3 is usable is defined as an up-down direction D1 in the present embodiment. Furthermore, a front-rear direction D2 and a left-right direction D3 are each defined based on a direction viewed from a user (operator) seated on (a driving part 321 of) the work machine 3 in a non-swiveling state of the swivel part 32. In other words, each of the directions used in the present embodiment is a direction defined based on the machine body 30 of the work machine 3, and a direction in which the machine body 30 moves at the time of the work machine 3 moving forward is referred to as "front", and a direction in which the machine body 30 moves at the time of the work machine 3 moving rearward is referred to as "rear". Similarly, a direction in which a front end portion of the machine body 30 moves at the time of the work machine 3 swinging to right is referred to as "right", and a direction in which the front end portion of the machine body 30 moves at the time of the work machine 3 swinging to left is referred to as "left". However, these directions are not intended to limit a use direction (direction in use) of the work machine 3.

The work machine 3 includes an engine serving as a power source. In the work machine 3, the engine drives a hydraulic pump 41 (see FIG. 2), for example, and hydraulic oil is supplied from the hydraulic pump 41 to hydraulic actuators (including a hydraulic motor 43 and a hydraulic cylinder 44) of each part of the machine body 30, thereby to drive the machine body 30. The work machine 3 is controlled, for example, by the user (operator), who is seated in the driving part 321 of the machine body 30, operating an operation lever and the like of the operation device 35.

It is assumed in the present embodiment that the work machine 3 is a passenger-use backhoe as described above, and therefore, the work part 33 is driven in accordance with an operation by the user (operator) seated in the driving part 321 so as to perform work such as excavation work. The driving part 321 in which the user is seated is provided at the swivel part 32.

Here, the display device 2 and the operation device 35 are installed on the driving part 321 of the machine body 30; the user can operate the operation device 35 while viewing various types of information that is displayed on the display device 2 and that is related to the work machine 3. As an example, a display screen of the display device 2 displays information on an operating state of the work machine 3, such as a cooling water temperature and a hydraulic oil temperature, so that the user can check, at the display device 2, the information that is necessary for operating the operation device 35 and that is related to the operating state of the work machine 3.

The traveling part 31 has a traveling function, and is so configured as to be capable of traveling (including swiveling) on the ground. The traveling part 31 includes, for example, a pair of right and left crawlers 311 and a blade 312. The traveling part 31 further includes the hydraulic motor 43 (hydraulic actuator) for traveling to drive the crawlers 311.

The swivel part 32 is disposed above the traveling part 31, and is so configured as to be swingable, relative to the traveling part 31, about a rotation shaft along the vertical direction. The swivel part 32 has a hydraulic motor (hydraulic actuator) for swiveling, and the like. The swivel part 32 includes, in addition to the driving part 321, the engine and the hydraulic pump 41. At a front end portion of the swivel part 32, there is provided a boom bracket 322 to which the work part 33 is attached.

The work part 33 is so configured as to be capable of performing work, including lifting work. The work part 33 is supported by the boom bracket 322 of the swivel part 32, and performs work. The work part 33 includes a bucket 331, a boom 332, and an arm 333. The work part 33 further includes the hydraulic actuators (including the hydraulic cylinder 44 and a hydraulic motor) for driving each portion.

The bucket 331 is a type of attachment (work instrument) that is attached to the machine body 30 of the work machine 3, and that is composed of an optional instrument selected from among a plurality of types of attachments according to content of the work. The bucket 331, as an example, is removably attached to the machine body 30 and is replaced according to the content of the work. In addition to the bucket 331, attachments for the work machine 3 include various instruments, such as a breaker, an auger, a crusher, a fork, a fork claw, a steel cutter, an asphalt cutter, a mower, and a ripper, a mulcher, a tilt rotator, and a tamper. The work part 33 performs work by driving the bucket 331 with power from the driving device.

The boom 332 is supported by the boom bracket 322 of the swivel part 32 in a rotatable manner. Specifically, the boom 332 is supported at the boom bracket 322 in a rotatable manner about a rotation shaft along a horizontal direction. The boom 332 is so shaped as to extend upward from a base end portion supported by the boom bracket 322. The arm 333 is coupled to a tip end of the boom 332. The arm 333 is supported to the boom 332 in a rotatable manner about a rotation shaft along the horizontal direction. The bucket 331 is attached to a tip end of the arm 333.

The work part 33 moves under power from the engine as the power source. Specifically, the engine drives the hydraulic pump 41 thereby to supply hydraulic oil from the hydraulic pump 41 to the hydraulic actuator (hydraulic cylinder 44 or the like) of the work part 33, thereby to move each of the portions (bucket 331, boom 332, and arm 333) of the work part 33.

In the present embodiment, the work part 33, in particular, has an articulated configuration in which the boom 332 and the arm 333 are individually rotatable. That is, the boom 332 and the arm 333 rotate about the respective rotation shafts extending along the horizontal direction so that the articulated work part 33 including the boom 332 and the arm 333 is capable of performing extending and folding movements as a whole.

Each of the traveling part 31 and the swivel part 32, as well as the work part 33, moves under power from the engine as the power source. In other words, hydraulic oil is supplied from the hydraulic pump 41 to the hydraulic motor 43 of the traveling part 31, a hydraulic motor of the swivel part 32, and the like, thereby to move the swivel part 32 and the traveling part 31.

The engine functions as a power source that supplies power to each part as described above. Here, the engine as well as the hydraulic pump 41 and the like are installed in the swivel part 32. As an example in the present embodiment, the engine is a diesel engine. The engine is driven by fuel (herein, light oil) supplied from a fuel tank.

The operation device 35 is placed at the driving part 321 of the machine body 30, and is a user interface for receiving an operation input by the user (operator). As an example in the present embodiment, the operation device 35 includes a pair of operation levers. The operation device 35 is used to operate each of the traveling part 31, the swivel part 32, and the work part 33. Therefore, for example, when the user (operator) operates the operation device 35, the power or the like supplied to the hydraulic actuators (including the hydraulic motor 43 and hydraulic cylinder 44, etc.) of each part of the machine body 30 is controlled, and movements of each of the traveling part 31, the swivel part 32 and the work part 33 are controlled.

Figure 3:
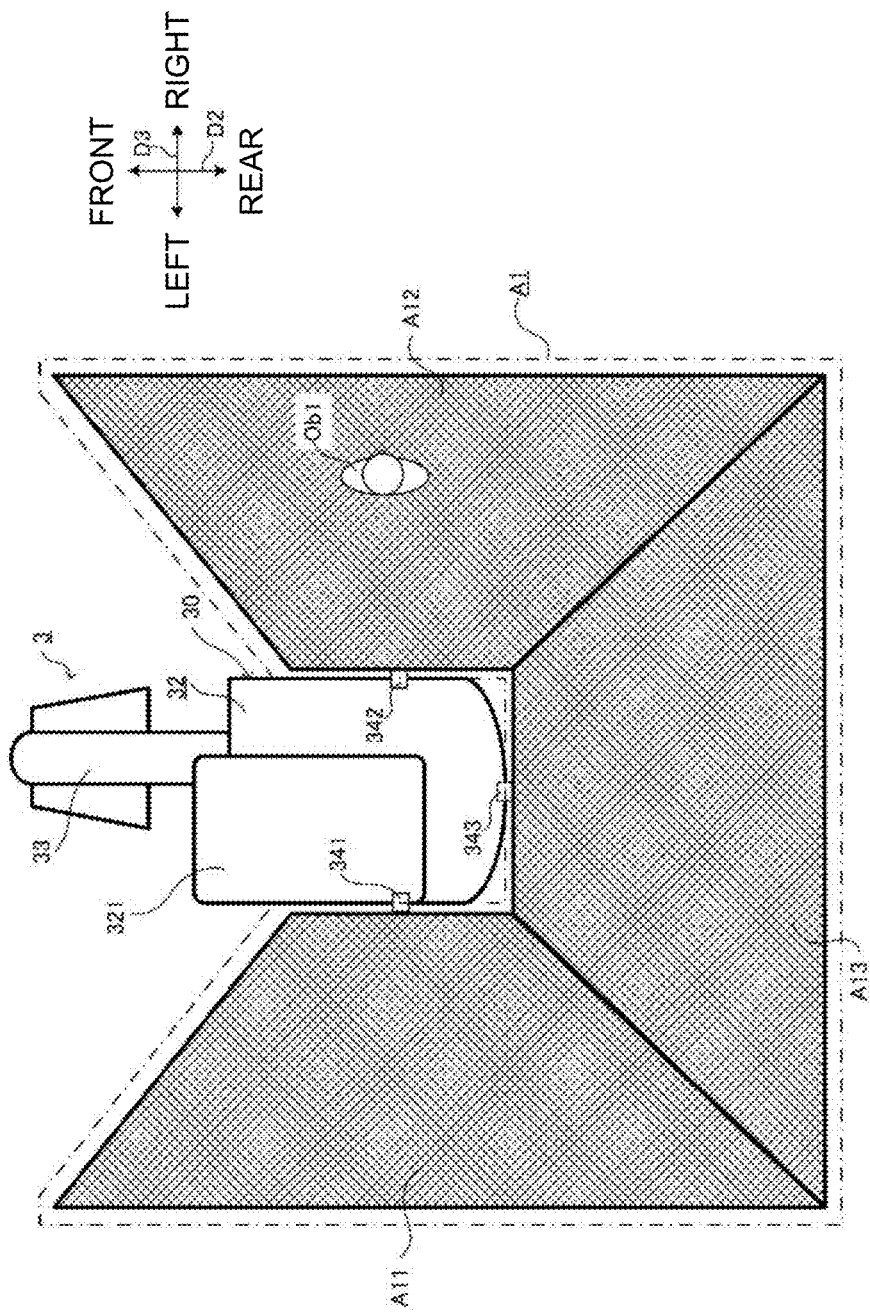
FIG. 3 is a plan view schematically illustrating a monitoring area and the like set around the work machine according to the first embodiment viewed from above the work machine.

Here, the machine body 30 is provided with various types of sensors (including cameras) that detect a detection target Ob1 (see FIG. 3) in a monitoring area A1 (see FIG. 3) around the work machine 3, such as a camera for capturing an image around the machine body 30. As an example in the present embodiment, as illustrated in FIG. 3, a plurality of cameras (herein, three cameras), including a left camera 341, a right camera 342, and a rear camera 343, are installed on the swivel part 32 of the machine body 30. The left camera 341, the right camera 342, and the rear camera 343 are connected to a control system 1 and output, to the control system 1, images captured by each of the cameras. FIG. 3 is a plan view of the work machine 3 viewed from above, schematically illustrating the monitoring area A1 set around the work machine 3, the detection target Ob1, and the machine body 30 of the work machine 3 (including the left camera 341, the right camera 342, and the rear camera 343).

The left camera 341, the right camera 342, and the rear camera 343 are placed to face left, right, and rear, respectively, based on the driving part 321 so as to capture images of the monitoring area A1 on left, right, and rear viewed from the operator seated in the driving part 321 of the swivel part 32. In other words, as illustrated in FIG. 3, the monitoring area A1 includes a plurality of (herein, three) small areas A11, A12, and A13, and the left camera 341 captures an image of the small area A11 (left area) which is on the left as seen from the operator seated in the driving part 321. Similarly, the right camera 342 captures an image of the small area A12 (right area) which is on the right as seen from the operator seated in the driving part 321, and the rear camera 343 captures an image of the small area A13 (rear area) which is at the rear as seen from the operator seated in the driving part 321. This enables the left camera 341, the right camera 342, and the rear camera 343 to cover the both sides (left and right) and the rear which are often blind spots for the operator.

In FIG. 2, a hydraulic circuit and an electric circuit (electric connections) of the work machine 3 according to the present embodiment are schematically illustrated. In FIG. 2, solid lines represent high-pressure oil paths (for hydraulic oil), dotted lines represent low-pressure oil paths (for pilot oil), and dashed-dotted line arrows represent electric signal paths. In addition, a thick (solid) line between a cutoff lever 350 and a cutoff switch 353 represents a physical connection between the cutoff lever 350 and the cutoff switch 353.

As illustrated in FIG. 2, the work machine 3 includes a pilot pump 42, a remote control valve 45, a control valve 46, and a direction switching valve (control valve) 47, in addition to the hydraulic pump 41, the hydraulic motor 43 (omitted in FIG. 2), and the hydraulic cylinder 44. The work machine 3 further includes the cutoff lever 350, a cutoff relay 352, the cutoff switch 353, and a sound output unit 36.

The hydraulic oil is supplied from the hydraulic pump 41 driven by the engine to the hydraulic motor 43 of the traveling part 31, the hydraulic motor of the swivel part 32, the hydraulic cylinder 44 of the work part 33, and the like. In this way, the hydraulic actuators such as the hydraulic motor 43 and the hydraulic cylinder 44 are driven.

Each of the hydraulic actuators, such as the hydraulic motor 43 and the hydraulic cylinder 44, includes the pilot-type direction switching valve 47 capable of changing a direction and a flow rate of the hydraulic oil supplied from the hydraulic pump 41. The direction switching valve 47 is driven when pilot oil serving as an input instruction is supplied from the pilot pump 42.

Here, the remote control valve 45 is provided, for example, in a supply path of the pilot oil to the direction switching valve 47 corresponding to the hydraulic cylinder 44 of the work part 33. The remote control valve 45 outputs a work operation instruction of the work part 33 in response to an operation of the operation device 35 (operation lever). The work operation instruction instructs an expanding movement, a contracting movement and the like of the work part 33. An electromagnetic control valve 46 (solenoid valve) is inserted between the remote control valve 45 and the pilot pump 42. The control valve 46 is connected via the cutoff relay 352 and the cutoff switch 353 to the power source 351 and operates according to current supplied from the power source 351.

Similarly, a remote control valve is also provided in a supply path of the pilot oil to a direction switching valve corresponding to the hydraulic motor 43 of the traveling part 31. This remote control valve outputs a travel operation instruction of the traveling part 31 in response to an operation of the operation device 35 (operation lever). The travel operation instruction instructs a travel movement (for example, forward movement or backward movement) of the traveling part 31. Further, a remote control valve is also provided in a supply path of the pilot oil to a direction switching valve corresponding to the hydraulic motor of the swivel part 32. This remote control valve outputs a swivel operation instruction of the swivel part 32 in response to an operation of the operation device 35 (operation lever). The swivel operation instruction instructs a swivel movement (for example, left swivel or right swivel) of the swivel part 32. The electromagnetic control valve 46 (solenoid valve) is also inserted between these remote control valves and the pilot pump 42. The control valve 46 is connected via the cutoff relay 352 and the cutoff switch 353 to the power source 351 and operates according to current supplied from the power source 351.

The control valve 46 opens the flow path of the pilot oil from the pilot pump 42 to the remote control valve 45 while the control valve 46 is energized, that is, in a state where current is supplied, and shuts off the flow path of the pilot oil while the control valve 46 is de-energized, that is, in a state where supply current is cut off. Therefore, when the supply current to the control valve 46 is cut off, the hydraulic actuator corresponding to the remote control valve 45 cannot be driven, and thus output of the hydraulic actuator is forcibly stopped regardless of an operation of the operation device 35 (operation lever).

Here, the cutoff relay 352 is connected to the control system 1 and is switched between on and off in response to a control signal (electric signal) supplied from the control system 1. The cutoff switch 353 is switched between on and off in response to an operation of the cutoff lever 350. Therefore, when both the cutoff relay 352 and the cutoff switch 353 are on, the control valve 46 becomes energized and the flow path of the pilot oil from the pilot pump 42 to the remote control valve 45 is opened so that the hydraulic actuator is driven in response to an operation of the operation device 35. On the other hand, when at least one of the cutoff relay 352 and the cutoff switch 353 is in an off state, the control valve 46 is de-energized and the flow path of the pilot oil is shut off so that the hydraulic actuator cannot be driven.

For example, when at least one of the cutoff relay 352 and the cutoff switch 353 that are connected to the control valve 46 inserted between the remote control valve corresponding to the hydraulic motor of the swivel part 32 and the pilot pump 42 is in an off state, the hydraulic motor of the swivel part 32 cannot be driven. In this state, output of the hydraulic actuator (hydraulic motor of the swivel part 32) is forcibly stopped regardless of an operation of the operation device 35, and therefore, a swivel movement of the swivel part 32 is prohibited.

More specifically, the cutoff switch 353 is interlocked with the cutoff lever 350, which is an example of a "disabling operation unit". The cutoff lever 350 is placed at the driving part 321 of the machine body 30, and receives an operation input by the user (operator). As an example in the present embodiment, the cutoff lever 350 can be operated along the up-down direction D1. When the cutoff lever 350 is at a "raised position" which is an upper end position in a movable range, the cutoff switch 353 is "off"; when the cutoff lever 350 is at a "lowered position" which is a lower end position in the movable range, the cutoff switch 353 is "on". When the cutoff switch 353 is in an off state, the hydraulic circuit is forcibly shut off at the control valve 46, which is a cutoff valve.

Therefore, when the cutoff relay 352 is in an on state and the cutoff lever 350 is at the "lowered position", the cutoff lever 350 enters an "enabled state" where the control of the work machine 3 corresponding to an operation of the operation device 35 is enabled, and thus the work machine 3 moves in response to the operation of the operation device 35. On the other hand, when the cutoff lever 350 is at the "raised position", the cutoff lever 350 enters a "disabled state" where the control of the work machine 3 corresponding to an operation of the operation device 35 is disabled, and thus the work machine 3 dose not move in response to the operation of the operation device 35. Therefore, when the cutoff lever 350 is at the "raised position", all of the traveling part 31, the swivel part 32, and the work part 33 are forcibly rendered inoperable. The user (operator) needs operate the cutoff lever 350 to the "lowered position" in order to enable the operation of the operation device 35. The cutoff lever 350 is a lever that is operated for locking a movement of the work machine 3 in the above manner, and is synonymous with a gate (type) lock lever.

Thus, in the work machine 3 according to the present embodiment, the enabled state where the control of the work machine corresponding to the operation of the operation device 35 is enabled and the disabled state where the control of the work machine corresponding to the operation of the operation device 35 is disabled switch according to the operation state of the disabling operation unit (cutoff lever 350). Therefore, for example, in a situation where a person is present around the work machine 3, such as when an operator gets on and off the work machine 3, a movement of the work machine 3 can be forcibly stopped (prohibited) by operating the disabling operation unit (cutoff lever 350) to the "disabled state".

The control system 1 is mainly configured by a computer system having one or more processors such as a Central Processing Unit (CPU) and one or more memories such as a Read Only Memory (ROM) and a Random Access Memory (RAM), executing various processes (information process). In the present embodiment, the control system 1 is an integrated control unit that controls the overall work machine 3, and includes, for example, an electronic control unit (ECU). However, the control system 1 may be provided separately from the integrated controller. The control system 1 will be described in detail in the column "[2] Configuration of Control System".

The display device 2 is placed at the driving part 321 of the machine body 30 and is a user interface for receiving an operation input by the user (operator) and outputting various information to the user. The display device 2 outputs an electric signal that accords to the operation by the user, for example, thereby to receive various operations by the user. Accordingly, the user (operator) can view a display screen Dp1 (see FIG. 4) displayed on the display device 2, and also can operate the display device 2 as necessary.

As illustrated in FIG. 2, the display device 2 includes a controller 21, an operation unit 22, and a display unit 23. The display device 2 is so configured as to be communicable with the control system 1, and can execute sending and receiving of data to and from the control system 1. As an example in the present embodiment, the display device 2 is a dedicated device used in the work machine 3.

The controller 21 controls the display device 2 in accordance with data from the control system 1. Specifically, the controller 21 outputs the electric signal that accords to the user's operation received by the operation unit 22, and displays, on the display unit 23, the display screen Dp1 generated by the control system 1.

Figure 4:
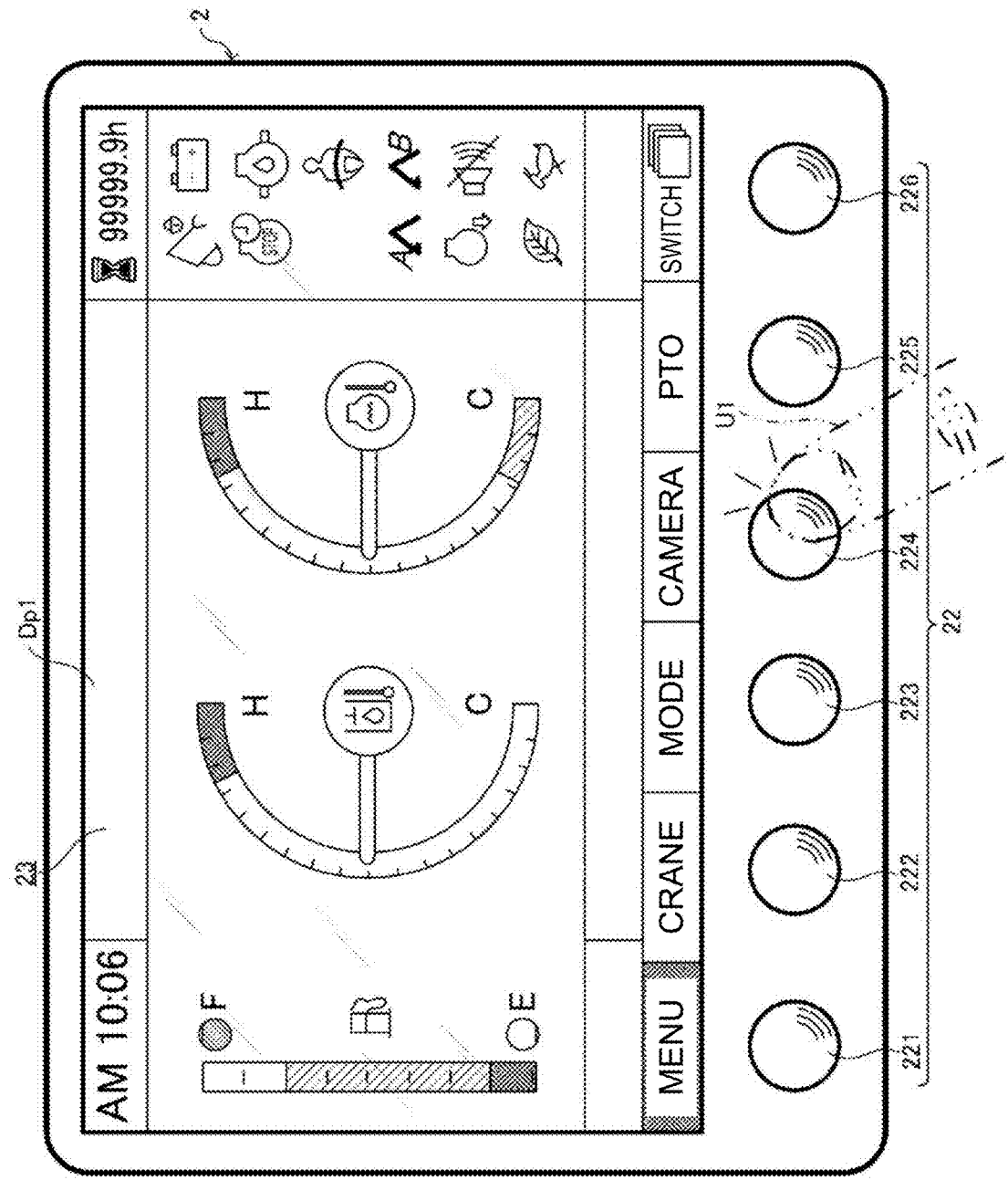
FIG. 4 is a schematic external view of a display device on which a display screen is displayed by a work machine control system according to the first embodiment.

The operation unit 22 is a user interface for receiving an operation input by the user (operator) to the display screen Dp1 displayed on the display unit 23. The operation unit 22 outputs the electric signal that accords to an operation of a user U1 (see FIG. 4), for example, thereby to receive various operations by the user U1. As an example in the present embodiment, the operation unit 22 includes a plurality of (herein, six) mechanical push button switches 221 to 226, as illustrated in FIG. 4. Along a periphery of a display area of the display unit 23, the plurality of push button switches 221 to 226 are placed in the vicinity of the display area (a lower portion in the example in FIG. 4). The plurality of push button switches 221 to 226 are associated with after-described items displayed on the display screen Dp1, and when any of the plurality of push button switches 221 to 226 is operated, a corresponding one of the items displayed on the display screen Dp1 is operated (selected).

Furthermore, the operation unit 22 may include a touch panel and an operation dial. Also in this case, any of the items displayed on the display screen Dp1 is operated (selected) by an operation performed on the operation unit 22.

The display unit 23 is a user interface for displaying information to the user U1 (operator), such as a liquid crystal display or an organic EL display that displays various types of information. The display unit 23 presents various types of information to the user by means of display. As an example in the present embodiment, the display unit 23 is a full-color liquid crystal display with a backlight and has a "horizontally-long" display area that is long in a transverse direction as illustrated in FIG. 4.

The display device 2 presents various information on the display screen Dp1 to the user U1 (operator) who operates the work machine 3. In other words, the user U1 who operates the work machine 3 can visually obtain various information related to the work machine 3 by viewing the display screen Dp1 displayed on the display device 2. As an example, the display device 2 displays information on an operating state of the work machine 3, such as a remaining amount of fuel, a cooling water temperature and a hydraulic oil temperature, so that the user U1 can check, at the display device 2, the information that is necessary for operating the work machine 3 and that is on the operating state of the work machine 3. The display device 2 can also display on the display screen Dp1 images of the areas around the work machine 3 (captured images of the monitoring area A1) captured by the left camera 341, the right camera 342, and the rear camera 343. Thus, when operating the work machine 3, the user U1 (operator) can check, on the display screen Dp1 displayed on the display device 2, the situations at the work machine 3's sides and rear which are likely to be blind spots from the driving part 321, for example. These information on the operating state of the work machine 3 and the captured image of the monitoring area A1 are both a type of information related to the work machine 3.

Furthermore, the work machine 3 includes the sound output unit 36 (see FIG. 2) that outputs sound (including voice) to the user U1 (operator). The sound output unit 36 includes a buzzer or a speaker and outputs sound upon receiving an electric signal. The sound output unit 36 is connected to the control system 1, and outputs the sound, such as a beep or a voice, according to a sound control signal from the control system 1. In the present embodiment, the sound output unit 36, as well as the display device 2, is provided at the driving part 321 of the machine body 30. The sound output unit 36 may be provided integrally with the display device 2.

Further, the machine body 30 is provided with a communication terminal, a fuel tank, a battery, and the like, in addition to the above configuration. The machine body 30 further includes sensors to monitor an operating condition of the machine body 30, such as a remaining fuel amount sensor, a cooling water temperature sensor, a hydraulic oil temperature sensor, a tachometer that measures an engine speed, and an hour meter that measures an operating time. Moreover, the machine body includes other sensors that detect states of a cutoff lever 350, a starter key switch, and the like.

[2] Configuration of Control System

Next, a configuration of the control system 1 according to the present embodiment will be described with reference to FIG. 2. The control system 1 controls the display device 2 to display the display screen Dp1 on the display device 2. In the present embodiment, the display device 2 is installed on the machine body 30 of the work machine 3 as described above. The control system 1 is a component of the work machine 3, and is included in the work machine 3 together with the machine body 30 and the like. In other words, the work machine 3 according to the present embodiment includes at least the control system 1 and the machine body (including the traveling part 31, the swivel part 32, and the work part 33) on which the display device 2 is installed.

A "screen", such as the display screen Dp1 in the present disclosure, refers to an image (picture) displayed on the display device 2 and includes graphic images, figures, photographs, text, and moving images. That is, the control system 1 can display, on the display device 2, the display screen Dp1 including a graphic image representing information on the operating state of the work machine 3, such as the cooling water temperature and the hydraulic oil temperature, for example. Here, when the display screen Dp1 includes a moving image or the like, the display screen Dp1 does not include a constant image but includes an image that changes from moment to moment.

As illustrated in FIG. 2, the control system 1 includes a display processor 11, a restraint processor 12, a switching processor 13, a data acquisition unit 14, a detector 15, and a selection processor 16, and a monitoring processor 17. As an example in the present embodiment, the control system 1 is mainly constituted by a computer system having one or more processors, and the plurality of functional units (display processor 11 and the like) are realized when the one or more processors execute a work machine control program. The plurality of functional units included in the control system 1 may be distributed to a plurality of housings or may be included in a single housing.

The control system 1 is so configured as to be communicable with devices included in each part of the machine body 30. In other words, at least the display device 2, the sound output unit 36, the cutoff relay 352, the cutoff switch 353, the left camera 341, the right camera 342, and the rear camera 343 are connected to the control system 1. Accordingly, the control system 1 can control the display device 2, the sound output unit 36, and the like, control the cutoff relay 352 to control the control valve 46, obtain captured images from the left camera 341, the right camera 342, the rear camera 343, and the like, and obtain electrical signals (cutoff signals) from the cutoff switch 353. Here, the control system 1 may send and receive various types of information (data) directly to and from each device, or indirectly through a repeater or the like.

The data acquisition unit 14 executes a data acquisition process of acquiring the captured image of the monitoring area A1 around the work machine 3. In the present embodiment, the data acquisition unit 14 regularly or irregularly acquires outputs of the left camera 341, the right camera 342 and the rear camera 343 from the left camera 341, the right camera 342 and the rear camera 343. In other words, the data acquisition unit 14 acquires image data (captured images) of the monitoring area A1 (respective small areas A11, A12, and A13) around the work machine 3.

Furthermore, the data acquisition unit 14 can regularly or irregularly acquire outputs (sensor signals) of the remaining fuel amount sensor, the cooling water temperature sensor, and the hydraulic oil temperature sensor, as well as outputs of other sensors by the data acquisition process. In other words, the data acquisition unit 14 acquires detection results (detection values) of various sensors, including data indicating the remaining amount of fuel, the temperature of the engine cooling water (cooling water temperature), and the temperature of the hydraulic oil (hydraulic oil temperature). The data acquisition unit 14 may acquire data from various sensors (including cameras) directly from the various sensors or indirectly via an electronic control unit or other devices. The data acquired by the data acquisition unit 14 is stored in a memory, for example.

The detector 15 detects the detection target Ob1 in the monitoring area A1 around the work machine 3. In other words, the detector 15 determines presence or absence (existence or nonexistence) of the detection target Ob1 in the monitoring area A1, and outputs a detection result indicating whether or not the detection target Ob1 is present in the monitoring area A1. As an example in the present embodiment, the detection target Ob1 is a "person". In other words, when a "person" enters the monitoring area A1 around the work machine 3 as a result of a movement of the work machine 3 or a movement of the "person" around the work machine 3, the detector 15 detects the "person" as the detection target Ob1. When a plurality of detection targets Ob1 are present in the monitoring area A1, the detector 15 may also detect the number of detection targets Ob1 (the number of persons).

In the present embodiment, the detector 15 detects the detection target Ob1 in the monitoring area A1 based on outputs (image data) of the left camera 341, the right camera 342, and the rear camera 343. Specifically, the detector 15 extracts a feature value in an image by performing the image process on the image data acquired by the data acquisition unit 14, and determines whether or not the detection target Ob1 ("person" in the present embodiment) is reflected in the image based on the feature value. Here, when the detection target Ob1 is reflected in the image, the detector 15 determines the detection target Ob1 is reflected in the image captured by which of the left camera 341, the right camera 342 and the rear camera 343. In other words, the detector 15 distinguishes that the detection target Ob1 is present in which of the small area A11 captured by the left camera 341, the small area A12 captured by the right camera 342, and the small area A13 captured by the rear camera 343, thereby to detect the detection target Ob1.

The restraint processor 12 executes a restraint process of restraining a movement of the work machine 3 based on the detection result of the detector 15. In the present embodiment, when the detection result of the detector 15 is a result indicating a presence of the detection target Ob1 (herein, a person) in the monitoring area A1, the restraint processor 12 executes the restraint process. The "restraint process" referred to in the present disclosure refers to a process that acts to restrain in some way a movement of the work machine 3. As an example, the restraint process includes a process of indirectly restraining a movement of the work machine 3 by warning the user U1 (operator) who operates the work machine 3 by means of sound or light (including display). Furthermore, the restraint process includes a process of directly restraining a movement of the work machine 3 by controlling the traveling part 31, the swivel part 32, and the work part 33 of the work machine 3.

In the present embodiment, the restraint processor 12 includes a sound output processor 121 and a restriction processor 122.

The sound output processor 121 controls the sound output unit 36 to output a notification sound when the detection target Ob1 is present in the monitoring area A1. Specifically, in the present embodiment, the restraint process includes a sound output process of outputting a notification sound. The notification sound may be a simple beep or a voice, such as a message "Please be careful". Furthermore, the notification sound may be changed depending on the detection result of the detector 15 (such as a distance from the machine body 30 to the detection target Ob1). Accordingly, since a movement of the work machine 3 may be indirectly restrained by warning the user U1 (operator) who operates the work machine 3 with a notification sound, a high degree of freedom in operating of the work machine 3 is realized. That is, when the user U1 operates the work machine 3 paying attention to the detection target Ob1, a movement of the work machine 3 can be continued while contact with the detection target Ob1 is avoided.

When the detection target Ob1 is present in the monitoring area A1, the restriction processor 122 controls the cutoff relay 352 so as to turn off the cutoff relay 352. Therefore, the control valve 46 connected to the power source 351 via the cutoff relay 352 is de-energized, and output of the hydraulic actuator corresponding to the control valve 46 is forcibly stopped. Specifically, in the present embodiment, the restraint process includes a restriction process of restricting a movement of the work machine 3. The "restriction process" referred to in the present disclosure refers to a process that acts to restrict in some way a movement of the work machine 3. As an example, the restriction process includes a process of prohibiting (disabling) the travel movement of the traveling part 31, a process of prohibiting (disabling) the swivel movement of the swivel part 32, and a process of prohibiting (disabling) the movement of the work part 33. Accordingly, a movement of the work machine 3 may be forcibly restricted regardless of an operation by the user U1 (operator). That is, contact between the machine body 30 and the detection target Ob1 caused by the movement of the work machine 3 can be avoided.

Here, the restriction process executed by the restriction processor 122 includes at least a process of restricting the swivel movement of the swivel part 32. Specifically, the restriction processor 122 is configured capable of controlling the cutoff relay 352 coupled to the control valve 46 corresponding to the hydraulic motor of the swivel part 32, and turns off the cutoff relay 352 when the detection target Ob1 is present in the monitoring area A1. Accordingly, in the case where the detection target Ob1 is present in the monitoring area A1, the hydraulic motor of the swivel part 32 cannot be driven, the swivel part 32 comes to an emergency stop when the swivel part 32 is in a swivel movement, and the swivel movement of the swivel part 32 is prohibited when the swivel part 32 is not in a swivel movement. Specifically, in the present embodiment, the work machine 3 includes the traveling part 31 and the swivel part 32 which is capable of swiveling with respect to the traveling part 31. The restriction process at least restricts the swivel movement of the swivel part 32. Accordingly, contact between the machine body 30 and the detection target Ob1 caused by swiveling of the swivel part 32 can be avoided, when the detection target Ob1 is present in the monitoring area A1 which is a blind spot for the user U1 (operator).

The selection processor 16 is configured to be capable of executing a selection process to select one movement mode from a plurality of movement modes. The plurality of movement modes here include at least a crane mode and another mode. The crane mode is a movement mode that causes the work part 33 to perform lifting work. Another mode is a movement mode that causes the work part 33 to perform work different from the lifting work. As an example in the present embodiment, another mode includes an excavation mode that causes the work part 33 to perform excavation work. In other words, in the present embodiment, the selection processor 16 alternatively selects the movement mode of the work machine 3 (work part 33 of the work machine 3) from among a plurality of movement modes, including a crane mode for lifting work and an excavation mode (another mode) for excavation work.

As an example in the present embodiment, switching the movement mode is performed by the user (operator) operating the display device 2. In other words, when the user operates the operation unit 22 of the display device 2 to select the crane mode, the selection processor 16 receives this operation and switches the movement mode of the work machine 3 to the crane mode. On the other hand, when the user operates the operation unit 22 of the display device 2 to select the excavation mode, the selection processor 16 receives this operation and switches the movement mode of the work machine 3 to the excavation mode. Thus, the selection processor 16 alternatively selects the movement mode in response to an operation of the operation unit 22.

The monitoring processor 17 executes a monitoring process of monitoring a movement state of the work machine 3. The "movement state" of the work machine 3 in the present disclosure refers to a state that pertains to the movement of the work machine 3 and can change from time to time. The monitoring processor 17 constantly monitors the movement state of the work machine 3. As an example in the present embodiment, the monitoring processor 17 monitors, as the movement state of the work machine 3, both the operation state of the cutoff lever 350 and whether or not the movement mode of the work machine 3 is the crane mode. In other words, the movement state of the work machine 3 basically includes the movement state that changes in response to an operation by the user (operator).

Specifically, the monitoring processor 17 monitors the operation state of the cutoff lever 350 serving as the disabling operation unit by monitoring on/off of the cutoff switch 353. For example, if the cutoff switch 353 is off, the monitoring processor 17 detects that the cutoff lever 350 is at the "raised position", that is, in the "disabled state". On the other hand, if the cutoff switch 353 is on, the monitoring processor 17 detects that the cutoff lever 350 is at the "lowered position", that is, in the "enabled state".

Furthermore, the monitoring processor 17 monitors whether or not the movement mode of the work machine 3 is the crane mode by monitoring the movement mode that is being selected at the selection processor 16. For example, if the crane mode is being selected at the selection processor 16, the monitoring processor 17 detects that the movement mode of the work machine 3 is the crane mode. On the other hand, if the excavation mode is being selected at the selection processor 16, the monitoring processor 17 detects that the movement mode of the work machine 3 is not the crane mode.

The display processor 11 executes a display process of displaying, on the display device 2, the display screen Dp1 including information related to the work machine 3. Specifically, the display processor 11 generates the display screen Dp1 based on data and the like acquired by the data acquisition unit 14, and controls the display device 2 so as to display the display screen Dp1 on the display unit 23 of the display device 2. Furthermore, the display processor 11 operates in response to an operation received by the operation unit 22 of the display device 2.

Here, the information related to the work machine 3 included in the display screen Dp1 includes operating information on the operating state of the work machine 3, for example, the remaining amount of fuel, the cooling water temperature, the hydraulic oil temperature, and suspended weight during lifting work, and the like. In other words, the display processor 11 can display, on the display device 2, the display screen Dp1 that includes operating information on the operating state of the work machine 3. Furthermore, the information related to the work machine 3 included in the display screen Dp1 displays, on the display screen Dp1, captured images Im11, Im12, and Im13 (see FIG. 6) captured by the left camera 341, right camera 342 and rear camera 343. In other words, the display processor 11 can display on the display device 2 the display screen Dp1 including the captured images Im11, Im12, and Im13 of the monitoring area A1 (respective small areas A11, A12, and A13) around the work machine 3.

The switching processor 13 executes a switching process of switching the display screen Dp1 to be displayed on the display device 2. In other words, the display screen Dp1 displayed on the display device 2 by the display processor 11 is not fixed, but can be switched among a plurality of screens by the switching processor 13. In the present embodiment, the switching processor 13 switches the display screen Dp1 displayed on the display device 2 among a plurality of screens. The plurality of screens include a basic screen Dp11 (see FIG. 5), which does not include the captured images Im11, Im12, and Im13, and a camera screen Dp12 (see FIG. 6), which includes the captured images Im11, Im12, and Im13. In other words, the switching processor 13 alternatively selects the screen to be displayed on the display device 2 as the display screen Dp1 from among a plurality of screens including the basic screen Dp11 and the camera screen Dp12.

In the present embodiment, the switching processor 13 switches, when a switching operation unit (e.g., push button switch 224) is operated, the display screen Dp1 to be displayed on the display device 2 among a plurality of screens according to a switching pattern. Here, the switching processor 13 changes the switching pattern according to the movement state of the work machine 3. In other words, the switching pattern of the display screen Dp1 at the time of operating the switching operation unit is changed according to the movement state of the work machine 3 (including the operation state of the cutoff lever 350 and whether or not the movement mode of the work machine 3 is the crane mode) monitored by the monitoring processor 17. Therefore, even though the switching operation unit is operated in the same way, if the movement state of the work machine 3 is different, the switching processor 13 switches the display screen Dp1 displayed on the display device 2 according to a different switching pattern.

In addition, in the present embodiment, the switching processor 13 performs at least one of a first switching process and a second switching process. The first switching process is a process in which, in accordance with switching from the enabled state to the disabled state, the display screen Dp1 to be displayed on the display device 2 is switched from the camera screen Dp12 that includes the captured images Im11, Im12, and Im13 of the monitoring area A1 around the work machine 3 to the basic screen Dp11 that does not include the captured images Im11, Im12, and Im13. The second switching process is a process in which, in accordance with switching from the disabled state to the enabled state, the display screen Dp1 to be displayed on the display device 2 is switched from the basic screen Dp11 to the camera screen Dp12. In other words, the switching processor 13 switches the display screen Dp1 according to the operation state of the cutoff lever 350 serving as the disabling operation unit, which is monitored by the monitoring processor 17. Therefore, the switching processor 13 can switch the display screen Dp1 displayed on the display device 2 simply by the user (operator) operating the cutoff lever 350 serving as the disabling operation unit.

Here, the detector 15 is not an essential component of the control system 1. For example, the control system 1 may be configured such that a detection result of an external detector is obtained and the restraint processor 12 executes the restraint process based on the detection result.

[3] Work Machine Control Method

Hereinafter, an example of a work machine 3's control method (hereinafter, simply referred to as a "control method") executed mainly by the control system 1 will be described with reference to FIG. 5 to FIG. 14.

The control method according to the present embodiment is executed by the control system 1, which is mainly constituted by a computer system, and in other words, the control method is embodied in a work machine control program (hereinafter, simply referred to as a "control program"). That is, the control program according to the present embodiment is a computer program that causes one or more processors to execute each of processes related to the control method. The above control program may be cooperatively executed by, for example, the control system 1 and the display device 2.

Here, when a preset specific start operation for executing the control program is performed, the control system 1 executes the following various types of processes related to the control method. Examples of the start operation include an operation of starting the engine of the work machine 3. Meanwhile, when a preset specific end operation is performed, the control system 1 ends the following various types of processes related to the control method. Examples of the end operation include an operation of stopping the engine of the work machine 3.

[3.1] Display Screen

Herein, first, a configuration of the display screen Dp1 displayed on the display unit 23 of the display device 2 by the control method according to the present embodiment will be described. In the drawings illustrating the display screen Dp1 displayed on the display unit 23 of the display device 2, such as FIG. 5, a dashed-dotted line, a leading line, and a reference sign representing regions are each merely for an illustrative purpose and may not be actually displayed at the display device 2.

Figure 5:
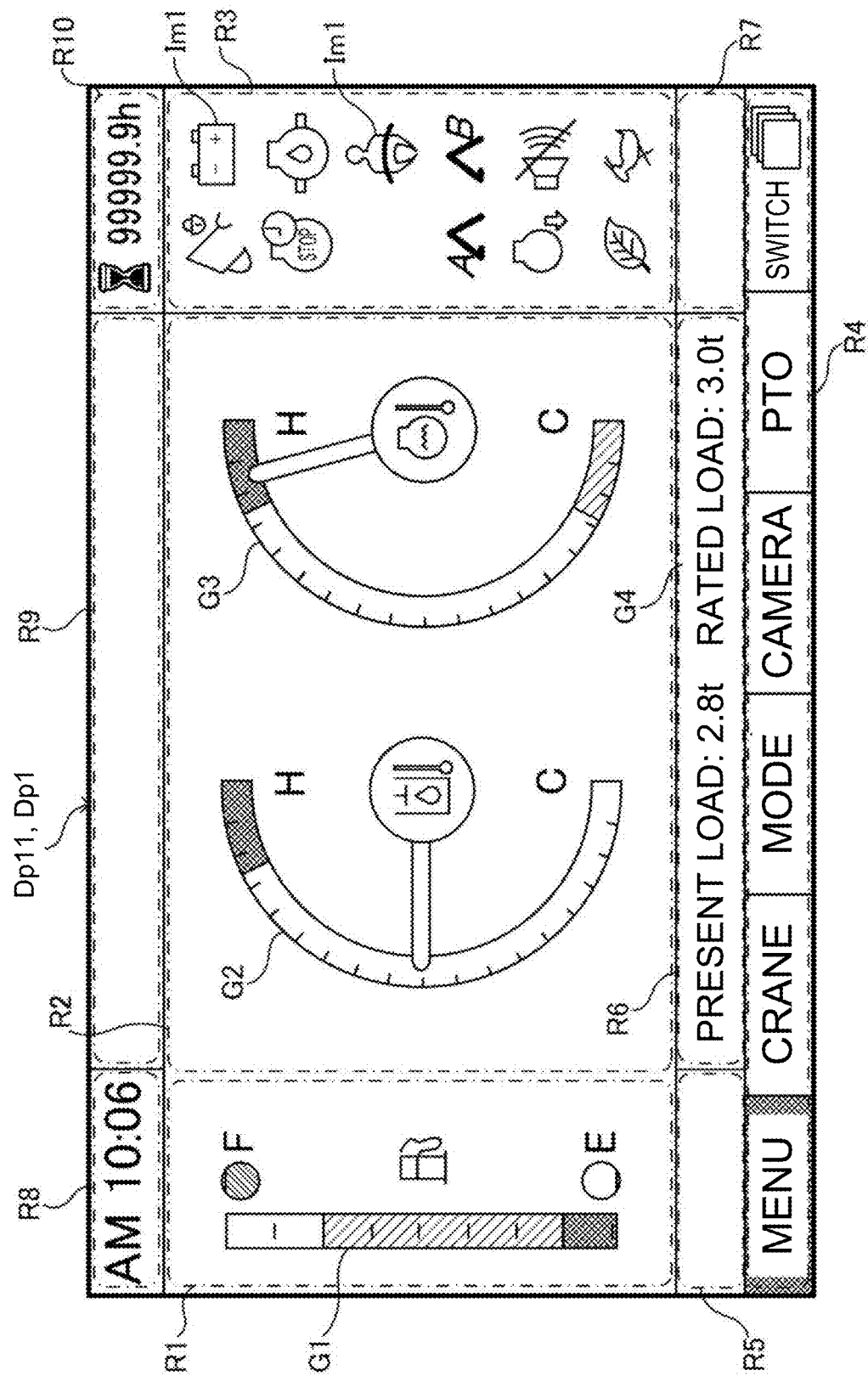
FIG. 5 is a diagram illustrating an example of a basic screen displayed by the work machine control system according to the first embodiment.

The display screen Dp1 illustrated in FIG. 5 is the basic screen Dp11, which does not include the captured images Im11, Im12, and Im13 of the monitoring area A1 around the work machine 3, as described above, and is a screen first displayed by the control method. This basic screen Dp11 is a home screen that serves as a starting point for the operation of the display device 2 on the work machine 3, and is a basic display screen Dp1 that is first displayed on the display device 2 while the work machine 3 is operating. According to an operation on the operation unit 22, the display screen Dp1 can be switched (transitioned) from the basic screen Dp11 to various display screens Dp1 including the camera screen Dp12, a menu screen Dp13 (see FIG. 14), a crane screen, a mode screen, and a PTO screen.

The basic screen Dp11 serving as the display screen Dp1 includes a first region R1 and a second region R2, as illustrated in FIG. 5. The basic screen Dp11 further includes a third region R3, a fourth region R4, a fifth region R5, a sixth region R6, a seventh region R7, an eighth region R8, a ninth region R9 and a tenth region R10.

Specifically, the basic screen Dp11 is vertically (the up-down direction) divided into four regions. Then, the upper three regions are further divided into three regions in the transverse direction (left-right direction). As a result, the basic screen Dp11 is divided into ten regions in total. Then, the second step regions from the top include, from left to right, the first region R1, the second region R2, and the third region R3. The lowest step region is the fourth region R4. Further, the third step regions from the top include, from left to right, the fifth region R5, the sixth region R6, and the seventh region R7, and the uppermost step regions include, from left to right, the eighth region R8, the ninth region R9, and the tenth region R10. Among the four regions vertically divided, a vertical size of the second step regions (the first region R1, the second region R2, and third region R3) from the top is the largest. Among the three regions transversely divided, a transverse size of middle regions (the second region R2, the sixth region R6, and the ninth region R9) is the largest.

However, the placement and size of the respective regions are merely examples and can be properly changed. The respective regions are not essential to be clearly divided by boundary lines. For example, even in the example in FIG. 5, the second region R2 and the third region R3 are clearly divided by a boundary line, while there is no boundary line between the first region R1 and the second region R2. Of course, the first region R1 and the second region R2 may be clearly divided by a boundary line.

The first region R1 is a rectangular region extending in the vertical direction. In the first region R1, for example, remaining amount information G1 regarding the remaining amount of fuel (e.g., diesel oil) in the engine is displayed. Based on an output (sensor signal) or the like of a remaining amount sensor, the display processor 11 generates the remaining amount information G1 in the display screen Dp1.

The second region R2 is a rectangular region extending in the transverse direction. In the second region R2, cooling water temperature information G3 and hydraulic oil temperature information G2 are displayed. The cooling water temperature information G3 and the hydraulic oil temperature information G2 are both information related to the work machine 3, especially information related to the operating state of the work machine 3. The display processor 11 generates the cooling water temperature information G3 in the basic screen Dp11 based on the output (sensor signal) of the cooling water temperature sensor acquired by the data acquisition unit 14. Similarly, the display processor 11 generates the hydraulic oil temperature information G2 in the basic screen Dp11 based on the output (sensor signal) of the hydraulic oil temperature sensor acquired by the data acquisition unit 14.

Thus, in the present embodiment, the information related to the work machine 3 included in the display screen Dp1 includes at least one of a remaining amount of fuel, a cooling water temperature, and a hydraulic oil temperature. The display screen Dp1 of the display device 2 displays information such as the remaining amount of fuel, the cooling water temperature and the hydraulic oil temperature, so that the user (operator) can check, at the display device 2, the information that is necessary for operating the operation device 35 and that is on the operating state of the work machine 3.

The third region R3 is a rectangular region extending in the vertical direction. In the third region R3, graphic images (icons) Im1 corresponding to operating states of respective components of the work machine 3 are displayed. In the third region R3, a plurality of the graphic images Im1 may be displayed, and a design (pattern) of each of the graphic images Im1 indicates which state of a battery, a seat belt, a cooling water temperature, a hydraulic oil temperature, and the like is represented, for example. Here, each of the graphic images Im1 indicates an operating state by, for example, a display mode, such as a display color or a size. The display processor 11 determines the state of each part of the work machine 3 using outputs of the various sensors (including the cooling water temperature sensor and the hydraulic oil temperature sensor) that detect the operating state of each part of the work machine 3. When an abnormal value is detected in any site, the display processor 11 performs warning display by changing the display mode, such as a display color, of the graphic image Im1 of the site.

The fourth region R4 is a band-shaped region that extends over an entire width of the display screen Dp1. The fourth region R4 displays items for operation on the display screen Dp1. In FIG. 5, six items including "Menu", "Crane", "Mode", "Camera", "PTO", and "Switch" are placed in this order from left in the fourth region R4, as an example. The six push button switches 221 to 226 of the operation unit 22 positioned right below the six items are associated with the six items, respectively. For example, the item "Menu" is associated with the push button switch 221, and the item "Crane" is associated with the push button switch 222. Therefore, when the push button switch 224 associated with the item "Camera" is operated by the user U1 (see FIG. 4), the item "Camera" is operated (selected).

Further, in the present embodiment, any of the items is highlighted in the fourth region R4 so as to correspond to an operation of an operation dial (or a cursor key) of the operation unit 22. The item "Menu" is highlighted in the example of FIG. 5, and the highlighted item is switched by operating the operation dial (or the cursor key). The user U1 can select a desired item by operating a determination button in a state where the desired item is highlighted. Therefore, for example, when the determination button is operated in a state where the item "Camera" is highlighted, the item "Camera" is operated (selected). Furthermore, when the operation unit 22 includes a touch panel, the user U1 can select a desired item by touching the desired item on the display screen Dp1.

In the fifth region R5, a warning display graphic image (icon) is displayed to indicate that an abnormal value is detected by the various sensors (including the cooling water temperature sensor and the hydraulic oil temperature sensor). In the sixth region R6, for example, information on the work part 33 that is operating in the work machine 3 is displayed. Specifically, when the movement mode of the work machine 3 is in the crane mode, the work machine information G4, such as a present load during lifting work and a rated load, is displayed in the sixth region R6. In the seventh region R7, for example, information on the operating state of the work machine 3, such as an engine speed, is displayed. In the eighth region R8, for example, a current time is displayed. In the ninth region R9, for example, information indicating an item to which the currently displayed display screen Dp1 belongs is displayed. In the tenth region R10, for example, information on an operating time (hour meter) of the work machine 3 is displayed.

In the present embodiment, as described above, the switching processor 13 switches the display screen Dp1 to be displayed on the display device 2 among a plurality of screens, which include the basic screen Dp11 and the camera screen Dp12 that includes the captured images Im11, Im12, and Im13. In other words, the display screen Dp1 displayed on the display device 2 is switchable from the basic screen Dp11 described above to the camera screen Dp12 as illustrated in FIG. 6 or FIG. 7 by the switching processor 13.

In the present embodiment, a plurality of the camera screens Dp12, which include a first camera screen Dp121 (see FIG. 6) and a second camera screen Dp122 (see FIG. 7), are available as the camera screens Dp12 displayed on the display device 2. The first camera screen Dp121 is a camera screen Dp12 that includes operating information (remaining amount information G1, etc.) on the operating state of the work machine 3 in addition to the captured images Im11, Im12, and Im13, whereas the second camera screen Dp122 is a camera screen Dp12 that does not include the operating information (remaining amount information G1, etc.).

Figure 6:
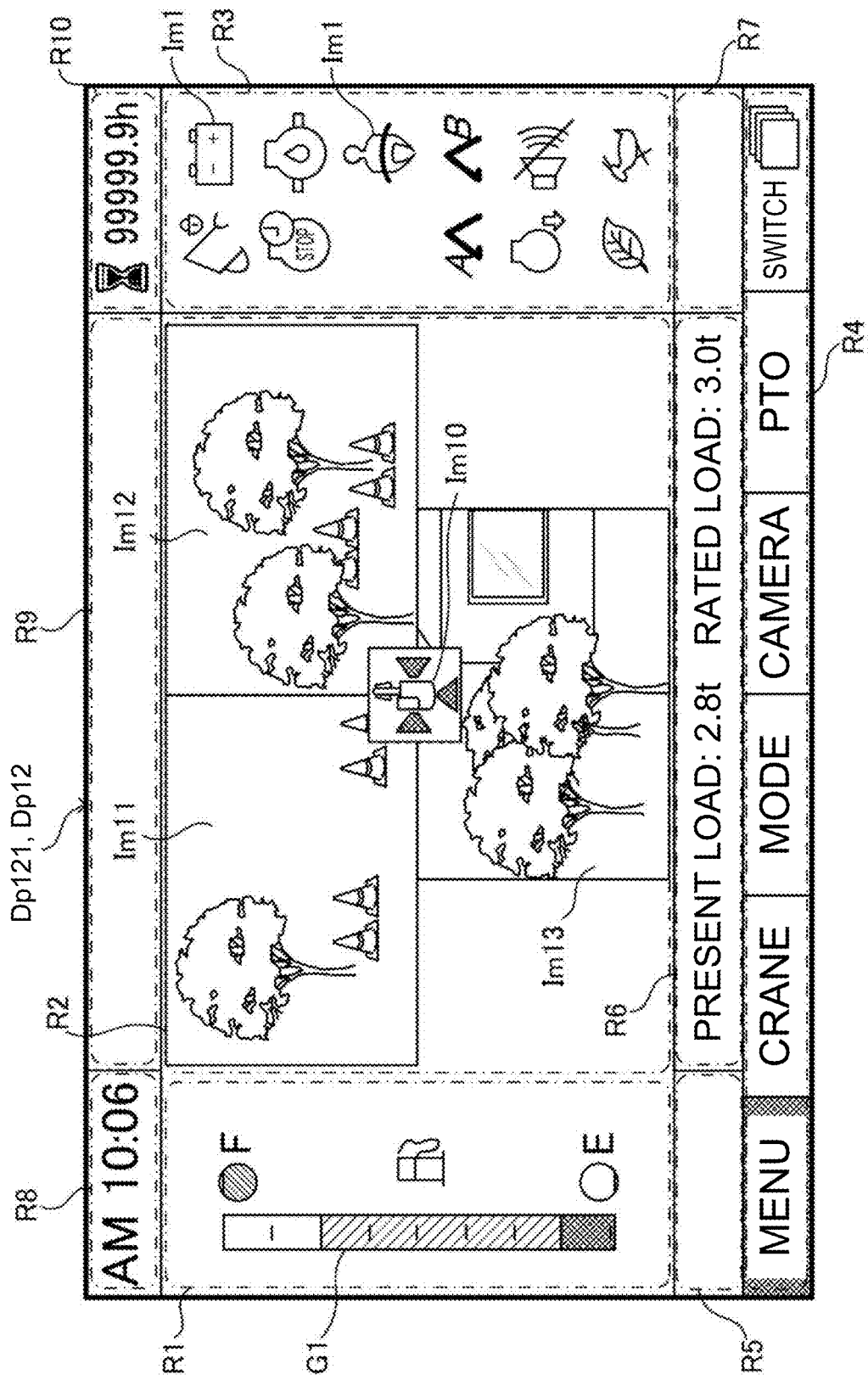
FIG. 6 is a diagram illustrating an example of a first camera screen displayed by the work machine control system according to the first embodiment.
Figure 7:
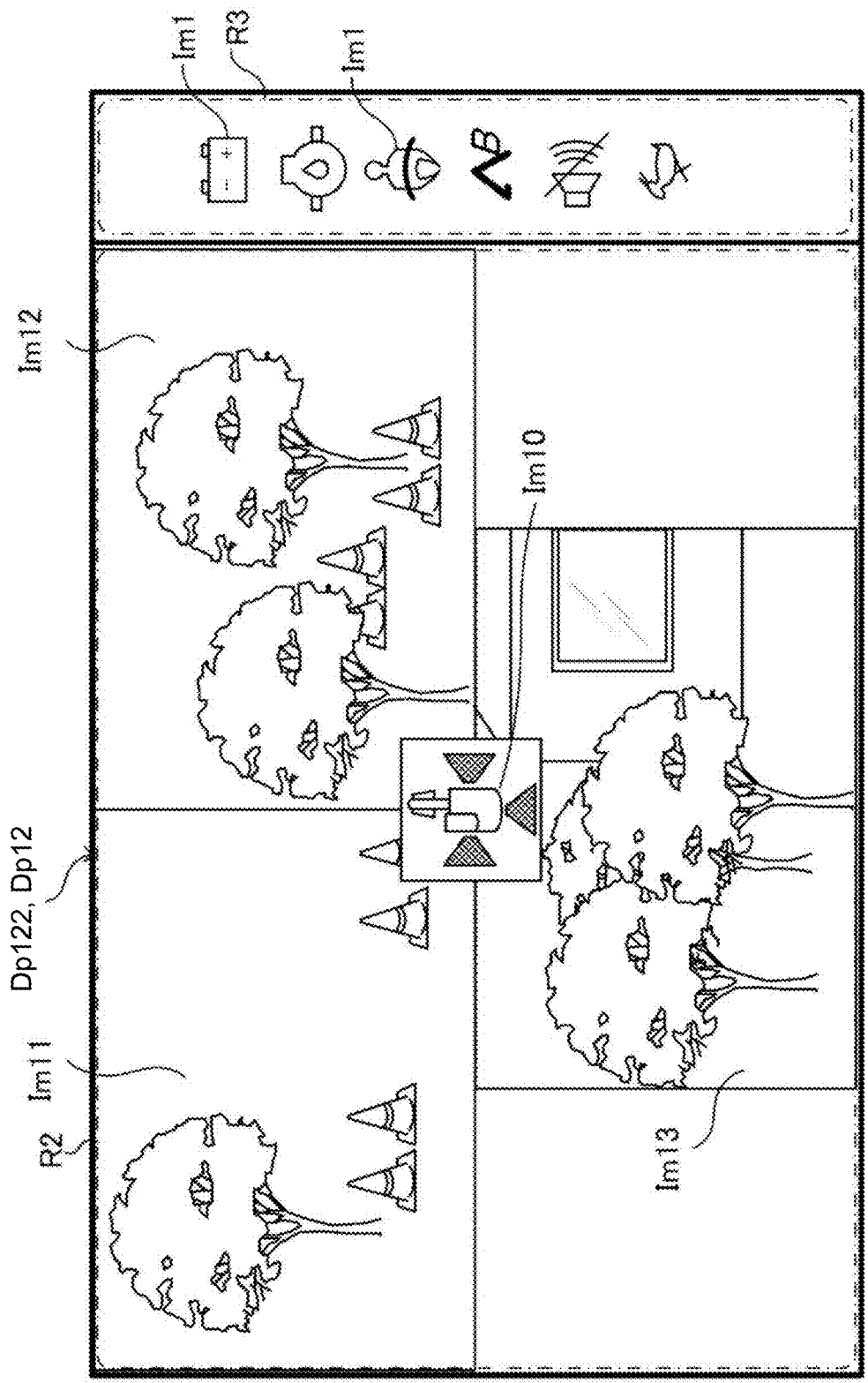
FIG. 7 is a diagram illustrating an example of a second camera screen displayed by the work machine control system according to the first embodiment.

The first camera screen Dp121 illustrated in FIG. 6 is a screen in which only the display content of the second region R2 has been changed from the basic screen Dp11 illustrated in FIG. 5. That is, the first camera screen Dp121 and the basic screen Dp11 are the same with respect to the display except for the second region R2. In the control method according to the present embodiment, as an example, the captured images Im11, Im12, and Im13 of the monitoring area A1 (respective small areas A11, A12, and A13) and the like are displayed in the second region R2 which occupies the majority of the first camera screen Dp121. Therefore, in addition to the captured images Im11, Im12, and Im13, the first camera screen Dp121 includes operating information on the operating state of the work machine 3, such as the remaining amount information G1 in the first region R1, the work machine information G4 in the sixth region R6, and the engine speed in the seventh region R7.

The captured image Im11 is an image of the small area A11, which is on the left of the driving part 321, captured by the left camera 341, and the captured image Im12 is an image of the small area A12, which is on the right of the driving part 321, captured by the right camera 342. The captured image Im13 is an image of the small area A13, which is at the rear of the driving part 321, captured by the rear camera 343. The display processor 11 displays the captured images Im11, Im12, and Im13 acquired by the data acquisition unit 14 in real time. In the present embodiment, the captured images Im11, Im12, and Im13 are displayed on an upper left portion of the second region R2, an upper right portion of the second region R2, and a lower center portion of the second region R2, respectively so as to correspond to the positional relationships when the machine body 30 is viewed from above. Furthermore, in a central portion of the second region R2, an icon Im10, which imitates the machine body 30 in accordance with the information, is displayed. The icon Im10 schematically shows the positional relationships of imaging ranges (small areas A11, A12, and A13) of the left camera 341, the right camera 342 and the rear camera 343, as seen from the machine body 30.

The second camera screen Dp122 illustrated in FIG. 7 is an enlarged screen of the second region R2 in which the captured images Im11, Im12, and Im13 are displayed as compared to the first camera screen Dp121. In the example in FIG. 7, the second camera screen Dp122 includes only two regions, i.e., the second region R2 and the third region R3, with a majority of the screen is the second region R2 and only a right edge portion of the screen is the third region R3. In other words, in the second camera screen Dp122, the first region R1 and the fourth to tenth regions R4 to R10 are not displayed, and the second region R2 is enlarged from a center area to peripheral areas where the first region R1 and other regions are displayed in the first camera screen Dp121.

Therefore, in the second camera screen Dp122, the captured images Im11, Im12, and Im13 are enlarged compared to the first camera screen Dp121, and thus the captured images Im11, Im12, and Im13 are displayed in a highly visible display mode. On the other hand, unlike the first camera screen Dp121, the second camera screen Dp122 does not include operating information on the operating state of the work machine 3, such as the remaining amount information G1 in the first region R1, the work machine information G4 in the sixth region R6, and the engine speed in the seventh region R7.

Figure 8:
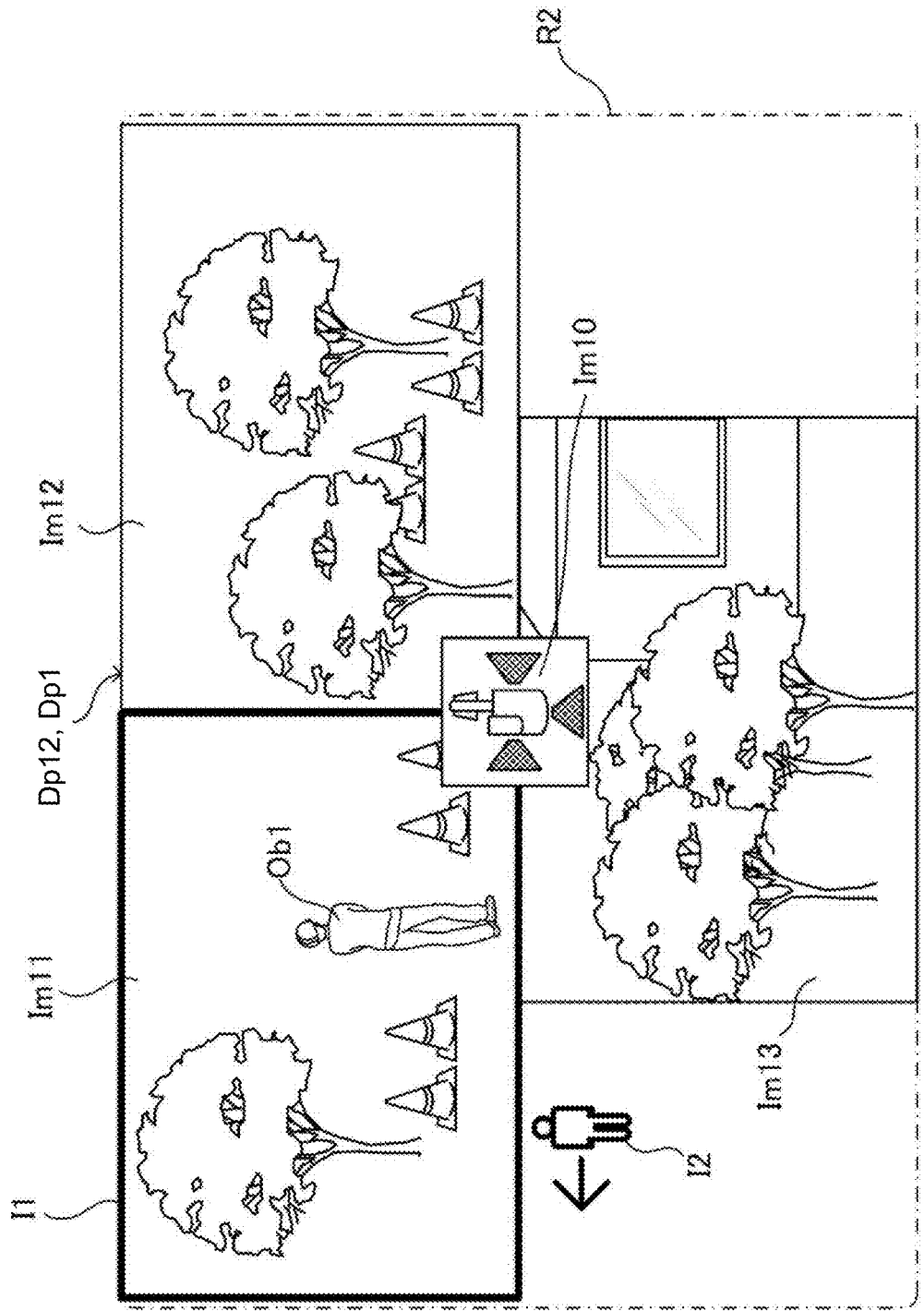
FIG. 8 is a diagram illustrating an example of a camera screen displayed by the work machine control system according to the first embodiment.

Here, in the present embodiment, as illustrated in FIG. 8, the camera screen Dp12 includes detection objects I1 and I2 indicating detection results of the detector 15. In FIG. 8, only the second region R2 of the display screen Dp1 (camera screen Dp12) is illustrated, and the illustration of regions other than the second region R2 are omitted. The detection object I1 is a band-shaped (frame-shaped) graphic image that displays, among the captured images Im11, Im12, and Im13, the captured image including the detection target Ob1 in an emphasized manner. The detection object I2 is a graphic image indicating a direction in which the detection target Ob1 is present as seen from the driving part 321. The example in FIG. 8 assumes a case where the detection target Ob1 (herein, "person") is present in the small area A11 that is captured by the left camera 341 and that is on the left of the driving part 321. Therefore, among the captured images Im11, Im12, and Im13, the captured image Im11 is displayed in an emphasized manner by the detection object Ti, and the detection object I2 indicating that the detection target Ob1 is present on the left of the driving part 321 is displayed below the captured image Im11. These detection objects I1 and I2 are displayed on both the first camera screen Dp121 and the second camera screen Dp122.

The display mode of the detection objects I1 and I2 is preferably changed according to a position of the detection target Ob1 in the monitoring area A1. For example, the display mode of the detection objects I1 and I2, such as a display color, a size, or a display pattern (including blinking pattern and the like), is changed according to a position of the detection target Ob1 in the monitoring area A1. For example, the closer the detection target Ob1 is to the machine body 30, the more conspicuous the display color of the display mode of the detection objects I1 and I2 becomes.

For example, as the detection target Ob1 moves closer to the machine body 30, the display color of the detection objects I1 and I2 changes from yellow to red.

Thus, the camera screen Dp12 not only displays the captured images Im11, Im12, and Im13 of the monitoring area A1, but also displays, as the detection objects I1 and I2, the detection result of the detection target Ob1 in the monitoring area A1. Therefore, the operator (user U1) can easily check the existence or nonexistence (presence or absence) of the detection target Ob1 in the monitoring area A1 by viewing the camera screen Dp12.

In short, in the control method according to the present embodiment, the camera screen Dp12 includes the captured images Im11, Im12, and Im13 in the monitoring area A1. Thus, on the camera screen Dp12 displayed on the display device 2, the operator (user U1) can check the situations at the work machine 3's sides and rear which are likely to be blind spots from the driving part 321. Therefore, compared to the configuration in which only the detection objects I1 and I2 are displayed, when the detection target Ob1 is present in the monitoring area A1, it is easier to recognize in detail, on the camera screen Dp12, the situation of the detection target Ob1.

[3.2] Switching Process

Next, the details of the switching process of the control method according to the present embodiment, in which the switching processor 13 switches the display screen Dp1 to be displayed on the display device 2, will be described with reference to FIGS. 9 and 10.

Figure 9:
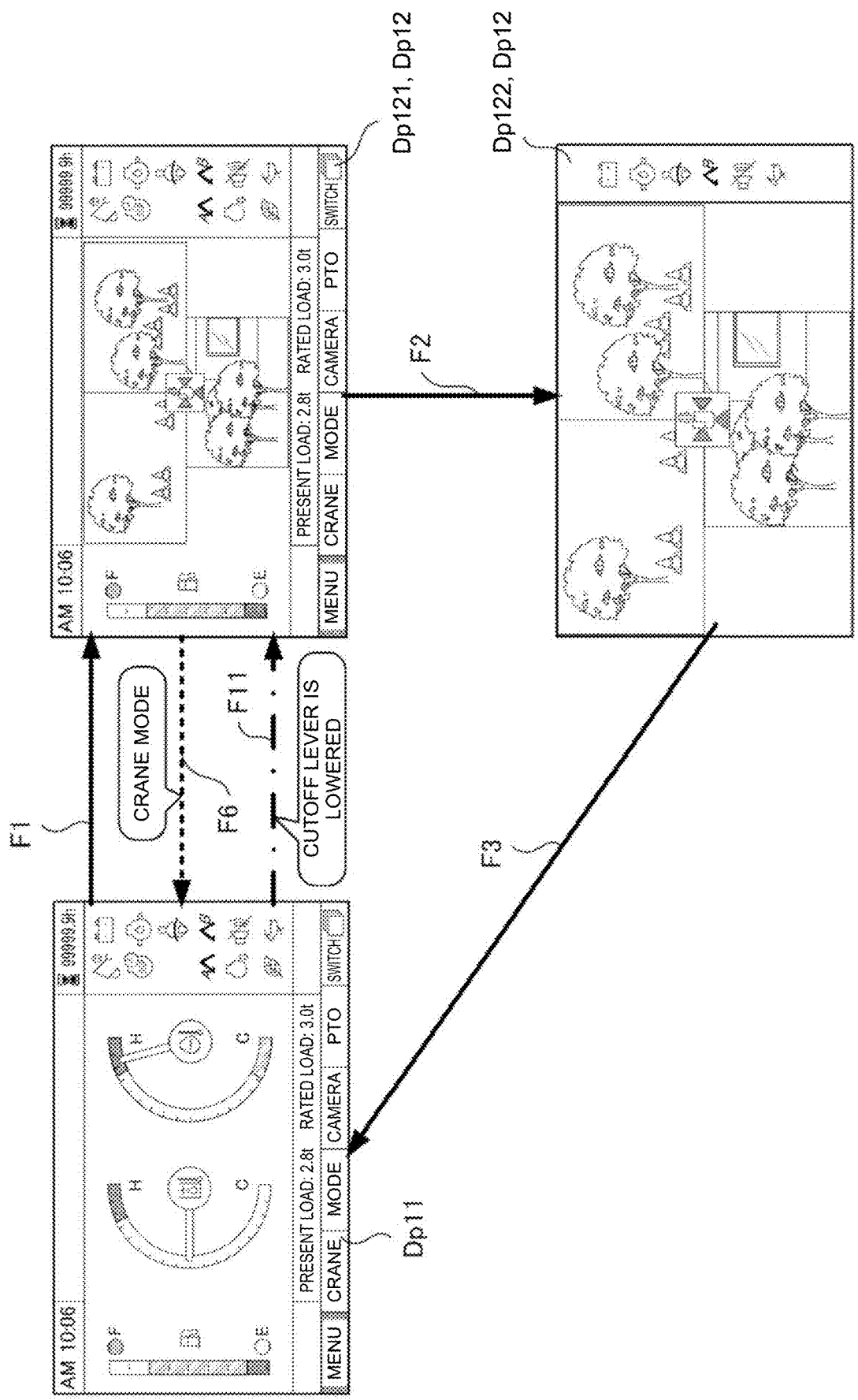
FIG. 9 is a diagram schematically illustrating a switching process for the display screen displayed by the work machine control system according to the first embodiment, when a cutoff lever is at a raised position.

FIG. 9 schematically illustrates the switching process of the display screen Dp1 when the cutoff lever 350 is in the "disabled state" where the control of the work machine 3 corresponding to the operation of the operation device 35 is disabled by being at the "raised position". Meanwhile, FIG. 10 schematically illustrates the switching process of the display screen Dp1 when the cutoff lever 350 is in the "enabled state" where the control of the work machine 3 corresponding to the operation of the operation device 35 is enabled by being at the "lowered position".

Figure 10:
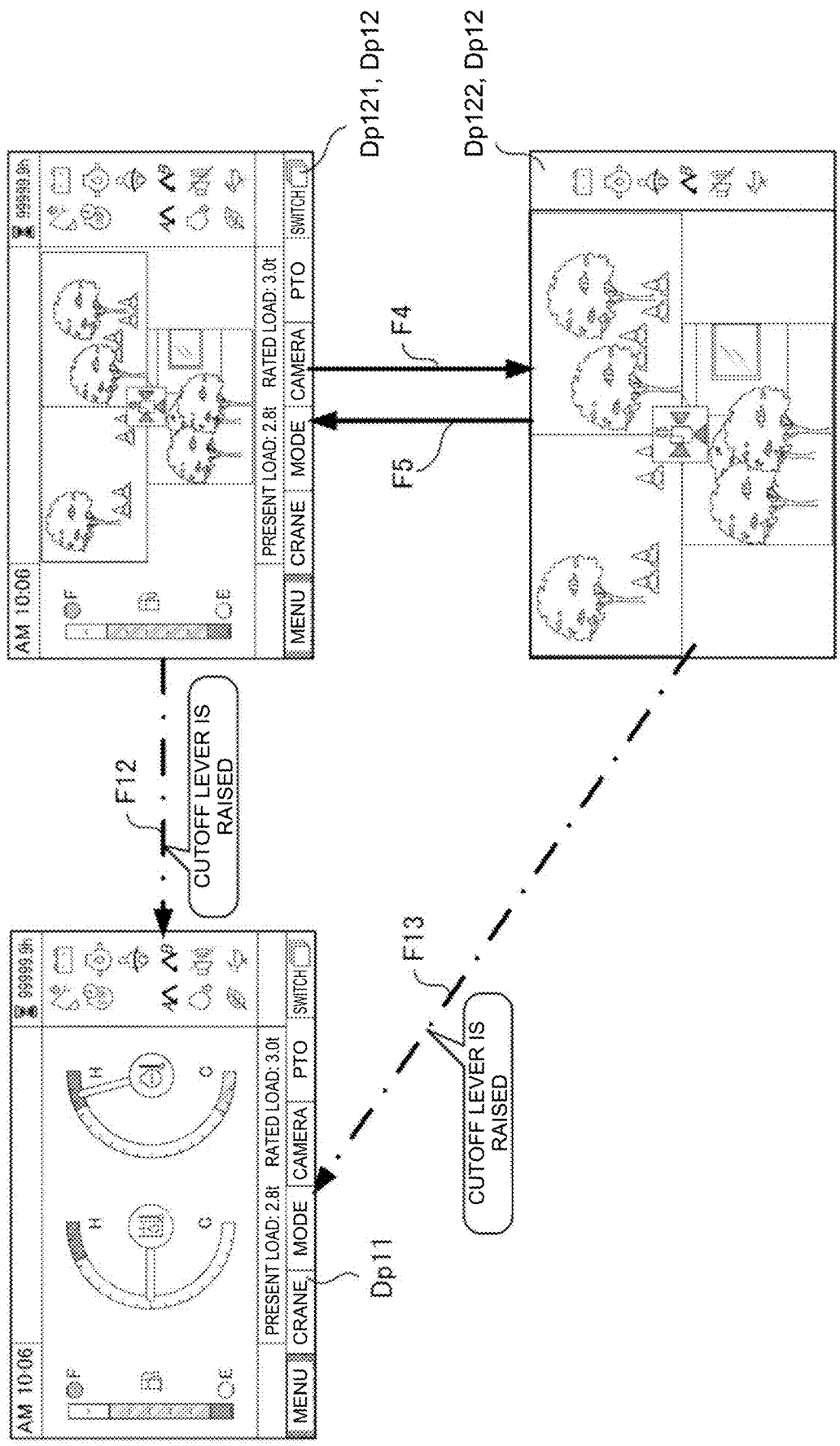
FIG. 10 is a diagram schematically illustrating a switching process for the display screen displayed by the work machine control system according to the first embodiment, when the cutoff lever is at a lowered position.

In FIGS. 9 and 10, arrows F1 to F5 shown by solid lines indicate the switching (transition) of the display screen Dp1 when the push button switch 224, which is an example of the switching operation unit, is operated, and arrows F11 to F13 shown by dashed-dotted lines indicate the switching (transition) of the display screen Dp1 when the cutoff lever 350, which is an example of the disabling operation unit, is operated. Furthermore, an arrow F6 shown by a dashed line in FIG. 9 indicates the switching (transition) of the display screen Dp1 when the push button switch 224 is operated in a case where the movement mode of the work machine 3 is the crane mode. In other words, in FIG. 9 and the arrows F1 to F5 other than the arrow F6 indicate the switching of the display screen Dp1 when the push button switch 224 is operated in a case where the movement mode of the work machine 3 is not in the crane mode, that is, in another mode such as the excavation mode. Meanwhile, the arrows F11 to F13 indicate the switching of the display screen Dp1 when the cutoff lever 350 is operated, regardless of the movement mode of the work machine 3.

As illustrated in FIGS. 9 and 10, the switching processor 13 switches the display screen Dp1 displayed on the display device 2 among a plurality of screens, which include the basic screen Dp11, the first camera screen Dp121, and the second camera screen Dp122, in response to an operation by the user (operator) on the switching operation unit or the disabling operation unit. As an example in the present embodiment, the switching operation unit is the push button switch 224 corresponding to the "Camera" item in the fourth region R4 of the display screen Dp1, and the disabling operation unit is the cutoff lever 350. Here, the monitoring processor 17 constantly monitors, as the operation state of the cutoff lever 350, whether the cutoff lever 350 is in the "disabled state" of being at the "raised position" or whether the cutoff lever 350 is in the "enabled state" of being at the "lowered position" based on on/off of the cutoff switch 353.

First, the switching process when the cutoff lever 350 is in the "disabled state" of being at the "raised position" will be described. In the "disabled state", as illustrated in FIG. 9, when the push button switch 224 (switching operation unit) is pressed while the basic screen Dp11 is being displayed, the display screen Dp1 displayed on the display device 2 switches from the basic screen Dp11 to the first camera screen Dp121 (arrow F1).

Here, if the movement mode of the work machine 3 is in another mode other than the crane mode, such as the excavation mode, when the push button switch 224 is pressed while the first camera screen Dp121 is being displayed, the display screen Dp1 displayed on the display device 2 switches from the first camera screen Dp121 to the second camera screen Dp122 (arrow F2). Furthermore, when the push button switch 224 is pressed while the second camera screen Dp122 is being displayed, the display screen Dp1 displayed on the display device 2 switches from the second camera screen Dp122 to the basic screen Dp11 (arrow F3).

On the other hand, if the movement mode of the work machine 3 is in the crane mode, when the push button switch 224 is pressed while the first camera screen Dp121 is being displayed, the display screen Dp1 displayed on the display device 2 switches from the first camera screen Dp121 to the basic screen Dp11 (arrow F6). In other words, if the movement mode of the work machine 3 is in the crane mode, only the first camera screen Dp121 is displayed as the camera screen Dp12, and a switching destination from the first camera screen Dp121 is the basic screen Dp11, but not the second camera screen Dp122.

Thus, when the cutoff lever 350 is in the "disabled state" of being at the "raised position", each time the switching operation unit (push button switch 224) is operated, the display screen Dp1 basically switches among the basic screen Dp11, the first camera screen Dp121, and the second camera screen Dp122, and cycles in this order. Therefore, any of the following screens can be displayed on the display device 2: the basic screen Dp11, which does not include the captured images Im11, Im12, and Im13; the first camera screen Dp121, which displays the captured images Im11, Im12, and Im13 in small size; and the second camera screen Dp122, which displays the captured images Im11, Im12, and Im13 in large size. On the other hand, when the movement mode of the work machine 3 is in the crane mode, the second camera screen Dp122 is not displayed, and each time the switching operation unit (push button switch 224) is operated, the display screen Dp1 alternately switches between the two screens of the basic screen Dp11 and the first camera screen Dp121.

When the movement mode of the work machine 3 is in the crane mode, as the camera screen Dp12, only the first camera screen Dp121 that includes the operating information such as the work machine information G4 is displayed, but not the second camera screen Dp122 that does not include the operating information such as the work machine information G4. Therefore, when the work machine 3 is in the crane mode and performing lifting work, the work machine information G4, such as the present load in the lifting work and the rated load, can be constantly displayed, which improves workability.

When the cutoff lever 350 is in the "disabled state" of being at the "raised position", if the cutoff lever 350 is operated to the "lowered position" while the basic screen Dp11 is being displayed, the display screen Dp1 displayed on the display device 2 switches from the basic screen Dp11 to the camera screen Dp12 (arrow F11). In other words, if the cutoff lever 350 is operated from the "raised position" to the "lowered position" and thus switched to the "enabled state" while the basic screen Dp11 is being displayed, the display screen Dp1 automatically switches from the basic screen Dp11, which does not include the captured images Im11, Im12, and Im13, to the camera screen Dp12, which includes the captured images Im11, Im12, and Im13.

As an example in the present embodiment, the camera screen Dp12 displayed on the display device 2 as the cutoff lever 350 is operated to the "lowered position" is the first camera screen Dp121 out of the first camera screen Dp121 and the second camera screen Dp122. However, the present disclosure is not limited to this example, the camera screen Dp12 displayed on the display device 2 as the cutoff lever 350 is operated to the "lowered position" may be the second camera screen Dp122. Note that even if the cutoff lever 350 is operated from the "raised position" to the "lowered position" while the first camera screen Dp121 or the second camera screen Dp122 is being displayed originally, switching to the display screen Dp1 is not performed.

Next, the switching process when the cutoff lever 350 is in the "enabled state" of being at the "lowered position" will be described. In the "enabled state", if the movement mode of the work machine 3 is in another mode other than the crane mode, such as the excavation mode, when the push button switch 224 is pressed while the first camera screen Dp121 is being displayed, as illustrated in FIG. 10, the display screen Dp1 displayed on the display device 2 switches from the first camera screen Dp121 to the second camera screen Dp122 (arrow F4). Furthermore, if the push button switch 224 is pressed while the second camera screen Dp122 is being displayed, the display screen Dp1 displayed on the display device 2 switches from the second camera screen Dp122 to the first camera screen Dp121 (arrow F5).

On the other hand, if the movement mode of the work machine 3 is in the crane mode, even if the push button switch 224 is pressed while the first camera screen Dp121 is being displayed, the display screen Dp1 displayed on the display device 2 does not switch from the first camera screen Dp121. In other words, if the movement mode of the work machine 3 is in crane mode, only the first camera screen Dp121 is displayed as the camera screen Dp12.

Thus, when the cutoff lever 350 is in the "enabled state" of being at the "lowered position", each time the switching operation unit (push button switch 224) is operated, the display screen Dp1 basically alternately switches between two screens of the first camera screen Dp121 and the second camera screen Dp122. Therefore, either the first camera screen Dp121, in which the captured images Im11, Im12, and Im13 are displayed in small size, or the second camera screen Dp122, in which the captured images Im11, Im12, and Im13 are displayed in large size, can be displayed on the display device 2. On the other hand, when the movement mode of the work machine 3 is in the crane mode, the second camera screen Dp122 is not displayed, and the display screen Dp1 is not switched from the first camera screen Dp121 even if the switching operation unit (push button switch 224) is operated.

When the movement mode of the work machine 3 is in the crane mode, as the camera screen Dp12, only the first camera screen Dp121 that includes the operating information such as the work machine information G4 is displayed, but not the second camera screen Dp122 that does not include the operating information such as the work machine information G4. Therefore, when the work machine 3 is in the crane mode and performing lifting work, the work machine information G4, such as the present load in the lifting work and the rated load, can be constantly displayed, which improves workability.

When the cutoff lever 350 is in the "enabled state" of being at the "lowered position", if the cutoff lever 350 is operated to the "raised position" while the camera screen Dp12 (first camera screen Dp121 or second camera screen Dp122) is being displayed, the display screen Dp1 displayed on the display device 2 switches from the camera screen Dp12 to the basic screen Dp11 (arrows F12 and F13). In other words, if the cutoff lever 350 is operated from the "lowered position" to the "raised position" and thus switched to the "disabled state" while the camera screen Dp12 is being displayed, the display screen Dp1 automatically switches from the camera screen Dp12, which include the captured images Im11, Im12, and Im13, to the basic screen Dp11, which does not include the captured images Im11, Im12, and Im13.

As described above, the control method according to the present embodiment includes displaying the display screen Dp1 including information related to the work machine 3 on the display device 2, and switching, when the switching operation unit is operated, the display screen Dp1 to be displayed on the display device 2 among a plurality of screens according to a switching pattern. Here, the control method further includes changing the switching pattern according to a movement state of the work machine 3. The "switching pattern" referred to in the present disclosure is a rule used in the switching process in response to the operation of the switching operation unit (push button switch 224), and includes a switching target, a switching destination, and a switching order (transition order) of the display screen Dp1. In other words, as results of executing the switching process according to the switching pattern, the above-mentioned switching of the display screen Dp1 as illustrated in FIGS. 9 and 10 is achieved.

Such switching patterns are not invariant. The switching patterns are changed according to the movement state of the work machine 3. For example, different switching patterns are applied when the cutoff lever 350 is in a state of being at the "raised position" (see FIG. 9) and when the cutoff lever 350 is in a state of being at the "lowered position" (see FIG. 10), so even if the switching operation unit (push button switch 224) is operated in the same way, the order in which the display screen Dp1 switches, or the like, is different. As a result, the order in which the display screen Dp1 switches, or the like, can be flexibly changed, which provides the advantage of improved operability, for example, the operator can reach the screen he or she wants to see relatively easily.

Here, the movement state of the work machine 3 includes at least one of the following: the operation state of the cutoff lever 350 and whether or not the movement mode of the work machine 3 is the crane mode. In the present embodiment, in particular, the movement state includes both the operation state of the cutoff lever 350 and whether or not the movement mode of the work machine 3 is the crane mode. Therefore, if the movement state, that is, either the operation state of the cutoff lever 350 ("raised position" or "lowered position") or whether or not the movement mode of the work machine 3 is the crane mode, changes, the switching pattern changes flexibly accordingly. These movement states are different in degree of safety considerations required for the operation of the work machine 3. Therefore, the switching pattern is changed according to the operator's operation, which further improves operability.

In the present embodiment, the switching operation unit is a single operation switch (e.g., push button switch 224). This makes it easier for the operator to operate the switching operation unit than in a case where a plurality of operation switches are provided. Moreover, the switching pattern is changed according to the movement state of the work machine 3, which improves operability.

The change in the switching pattern also includes a change in the number of a plurality of screens to be switched. For example, when the cutoff lever 350 is in the "disabled state" of being at the "raised position", if the movement mode of the work machine 3 is a mode other than the crane mode, the display screen Dp1 switches among three screens in response to the operation of the switching operation unit. Meanwhile, when the cutoff lever 350 is in the "disabled state" of being at the "raised position", if the movement mode of the work machine 3 is in the crane mode, the display screen Dp1 alternately switches between two screens in response to the operation of the switching operation unit. Thus, by changing the number of screens to be switched according to the switching pattern, more flexible switching of the display screen Dp1 can be achieved.

In addition, the change in the switching pattern includes a change in a screen that is a switching destination. For example, when the cutoff lever 350 is in the "disabled state" of being at the "raised position", if the movement mode of the work machine 3 is a mode other than the crane mode, the switching destination from the first camera screen Dp121 in response to the operation of the switching operation unit is the second camera screen Dp122. Meanwhile, when the cutoff lever 350 is in the "disabled state" of being at the "raised position", if the movement mode of the work machine 3 is in the crane mode, the switching destination from the first camera screen Dp121 in response to the operation of the switching operation unit is the basic screen Dp11. Thus, by changing the screen that is the switching destination according to the switching pattern, more flexible switching of the display screen Dp1 can be achieved.

When the movement state of the work machine 3 is in a first state, the plurality of screens to be switched include a single or a plurality of the camera screens Dp12 and the basic screen Dp11. The single or the plurality of camera screens Dp12 are screens including the captured images Im11, Im12, and Im13 of the monitoring area A1 around the work machine 3. The basic screen Dp11 is an image that does not include the captured images Im11, Im12, and Im13. In the present embodiment, the "disabled state" where the cutoff lever 350 is at the "raised position" is an example of the "first state". In other words, when the cutoff lever 350 is in the "disabled state" of being at the "raised position", the display screen Dp1 is switched among a plurality of screens, which include the plurality of camera screen Dp12 and the basic screen Dp11. Therefore, when the necessity to check the situation of the monitoring area A1 is low, for example, as in the "disabled state", the display screen Dp1 is switched to the basic screen Dp11, which does not include the captured images Im11, Im12, and Im13, so that necessary information can be displayed efficiently.

When the movement state of the work machine 3 is in a second state, the plurality of screens to be switched each include the plurality of camera screens Dp12 including the captured images Im11, Im12, and Im13 of the monitoring area A1 around the work machine 3. In the present embodiment, the "enabled state" where the cutoff lever 350 is at the "lowered position" is an example of the "second state". In other words, when the cutoff lever 350 is in the "enabled state" of being at the "lowered position", the display screen Dp1 is switched between the plurality of camera screens Dp12 (first camera screen Dp121 and second camera screen Dp122). Therefore, when the necessity to check the situation of the monitoring area A1, as in the "enabled state", the display screen Dp1 is switched to any camera screen Dp12 of the plurality of camera screens Dp12, so that necessary information can be displayed efficiently.

Here, the plurality of camera screens Dp12 differ from each other in the display mode of the captured images Im11, Im12, and Im13. The "display mode" referred to in the present disclosure includes (object) display color, size (including dimension, line thickness, etc.), shape, movement state (including animation, rotation/standstill, etc.) or display pattern (including blinking pattern, etc.), or a combination thereof. As an example, the sizes (dimensions) of the captured images Im11, Im12, and Im13 are different in the plurality of camera screens Dp12, such as the first camera screen Dp121 and the second camera screen Dp122. Therefore, by switching the display screen Dp1 to the camera screen Dp12 with the appropriate display mode of the captured images Im11, Im12, and Im13 among the plurality of camera screens Dp12, the necessary information can be displayed efficiently.

As described above, the control method according to the present embodiment is used for the work machine 3 in which the enabled state where the control of the work machine 3 corresponding to the operation of the operation device 35 is enabled and the disabled state where the control of the work machine 3 corresponding to the operation of the operation device 35 is disabled switch according to the operation state of the disabling operation unit. The control method includes displaying the display screen Dp1 including information related to the work machine 3 on the display device 2, and executing at least one of the first switching process and the second switching process. Here, the first switching process is a process in which, in accordance with switching from the enabled state to the disabled state, the display screen Dp1 to be displayed on the display device 2 is switched from the camera screen Dp12 to the basic screen Dp11. The camera screen Dp12 is a screen including the captured images Im11, Im12, and Im13 of the monitoring area A1 around the work machine 3. The basic screen Dp11 is a screen that does not include the captured images Im11, Im12, and Im13. The second switching process is a process in which, in accordance with switching from the disabled state to the enabled state, the display screen Dp1 to be displayed on the display device 2 is switched from the basic screen Dp11 to the camera screen Dp12.

Thus, the display screen Dp1 is automatically switched when the disabling operation unit (cutoff lever 350) is operated to switch between the "enabled state" and "disabled state", regardless of the operation of the switching operation unit (push button switch 224). For example, when the cutoff lever 350 is in a state of being at the "raised position" (see FIG. 9), if the cutoff lever 350 is operated to the "lowered position" and thus switched to the "enabled state", the display screen Dp1 is switched from the basic screen Dp11 to the camera screen Dp12 by the second switching process (arrow F11). Similarly, when the cutoff lever 350 is in a state of being at the "lowered position" (see FIG. 10), if the cutoff lever 350 is operated to the "raised position" and thus switched to the "disabled state", the display screen Dp1 is switched from the camera screen Dp12 to the basic screen Dp11 (arrows F12 and F13) by the first switching process. As a result, the display screen Dp1 automatically switches in conjunction with the operation of the disabling operation unit (cutoff lever 350), which provides the advantage of improved operability, for example, the operator can reach the screen he or she wants to see relatively easily.

Here, the camera screen Dp12 to be displayed on the display device 2 is one of a plurality of candidate screens, each of which includes the captured images Im11, Im12, and Im13. In the present embodiment, the first camera screen Dp121 and the second camera screen Dp122 are examples of the plurality of candidate screens. In other words, the camera screen Dp12 displayed on the display device 2 is not invariant, but is one candidate screen selected from the plurality of candidate screens, so that the camera screen Dp12 that is required at that time can be displayed.

The plurality of candidate screens include the first camera screen Dp121 that includes the operating information (remaining amount information G1, etc.) on the operating state of the work machine 3 in addition to the captured images Im11, Im12, and Im13, and the second camera screen Dp122 that does not include the operating information (remaining amount information G1, etc.). Therefore, the camera screen Dp12 that is automatically displayed by the second switching process can be appropriately selected from among the plurality of candidate images including the first camera screen Dp121 and the second camera screen Dp122.

[3.3] Overall Process

Figure 11:
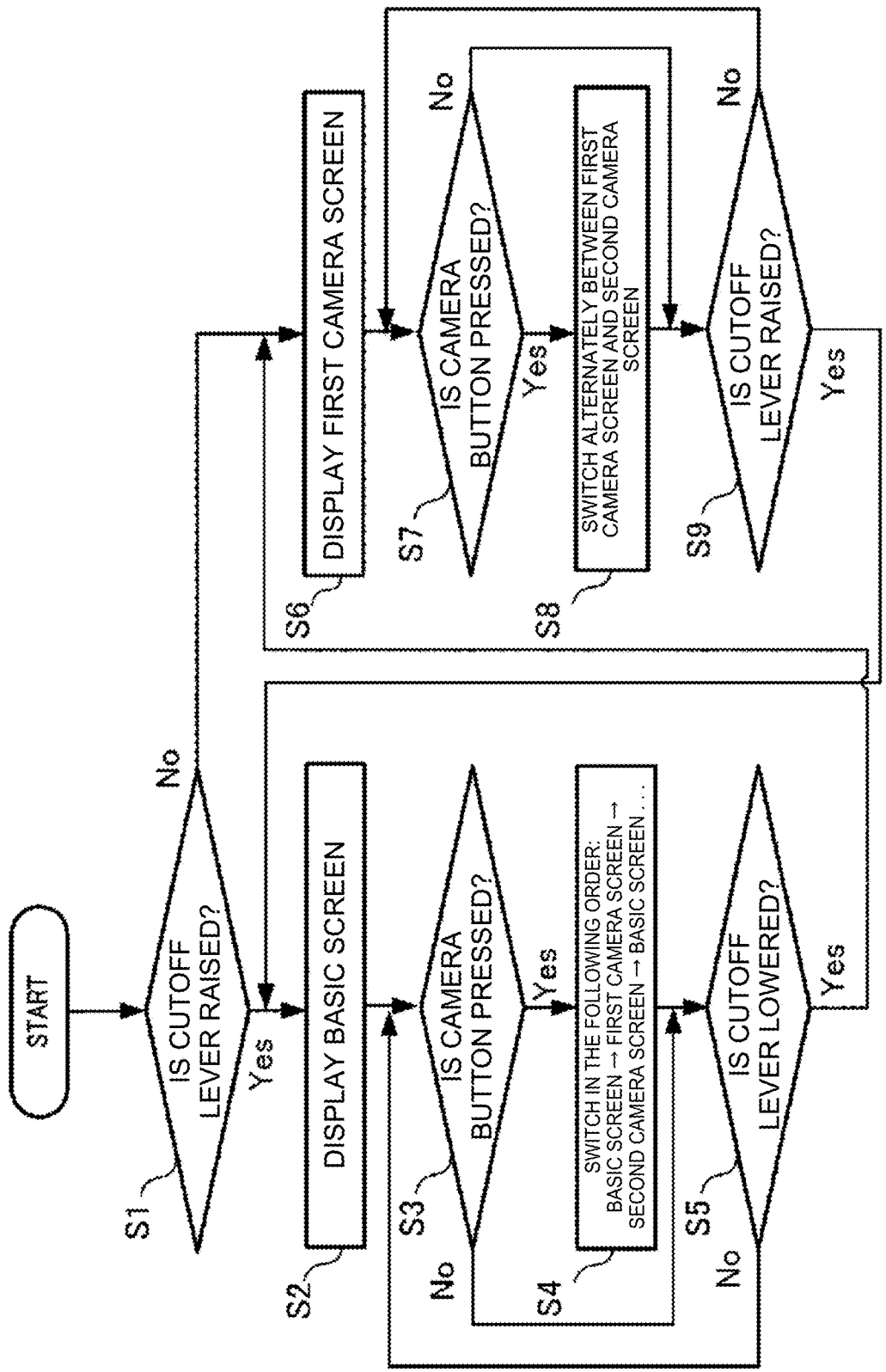
FIG. 11 is a flowchart illustrating an operation example of the work machine control system according to the first embodiment.

Next, the overall flow related to the switching process of the control method will be described with reference to FIG. 11. FIG. 11 is a flowchart illustrating an example of the process related to the control method when the movement mode of the work machine 3 is in another mode other than the crane mode, such as the excavation mode.

As illustrated in FIG. 11, the monitoring processor 17 of the control system 1 monitors whether the cutoff lever 350 is in the "disabled state" of being at the "raised position" or whether the cutoff lever 350 is in the "enabled state" of being at the "lowered position" based on on/off of the cutoff switch 353 (S1). If the cutoff switch 353 is off, the monitoring processor 17 determines that the cutoff lever 350 is in the "disabled state" of being at the "raised position" (S1: Yes), and the control system 1 shifts the process to step S2. Meanwhile, if the cutoff switch 353 is on, the monitoring processor 17 determines that the cutoff lever 350 is in the "enabled state" of being at the "lowered position" (S1: No), and the control system 1 shifts the process to step S6.

In step S2, the switching processor 13 of the control system 1 causes the display processor 11 to display the basic screen Dp11. In the next step S3, the switching processor 13 of the control system 1 monitors the operation state of the push button switch 224 (referred to as "camera button" in FIG. 11) serving as the switching operation unit. If the push button switch 224 is pressed (S3: Yes), the control system 1 shifts the process to step S4. Meanwhile, if the push button switch 224 is not pressed (S3: No), the control system 1 shifts the process to step S5.

In step S4, the switching processor 13 of the control system 1 switches the display screen Dp1 displayed on the display device 2 in the following order: the basic screen Dp11, the first camera screen Dp121, the second camera screen Dp122, and the basic screen Dp11. Thereby, the display screen Dp1 displayed on the display device 2 is switched in the order according to the switching pattern of arrows F1 to F3 illustrated in FIG. 9 each time the push button switch 224 is pressed (S3: Yes).

In step S5, the monitoring processor 17 of the control system 1 monitors whether or not the cutoff lever 350 is operated from the "raised position" to the "lowered position" based on on/off of the cutoff switch 353. When the cutoff switch 353 turns from off to on, the monitoring processor 17 determines that the cutoff lever 350 is operated to the "lowered position" (S5: Yes), and the control system 1 shifts the process to step S6. Meanwhile, if the cutoff switch 353 remains off, the monitoring processor 17 determines that the cutoff lever 350 is in the "disabled state" of being at the "raised position" (S5: No), and the control system 1 shifts the process to step S3.

In step S6, the switching processor 13 of the control system 1 causes the display processor 11 to display the first camera screen Dp121. In the next step S7, the switching processor 13 of the control system 1 monitors the operation state of the push button switch 224 serving as the switching operation unit. If the push button switch 224 is pressed (S7: Yes), the control system 1 shifts the process to step S8. Meanwhile, if the push button switch 224 is not pressed (S7: No), the control system 1 shifts the process to step S9.

In step S8, the switching processor 13 of the control system 1 alternately switches the display screen Dp1 displayed on the display device 2 between the first camera screen Dp121 and the second camera screen Dp122. Thereby, the display screen Dp1 displayed on the display device 2 is switched in the order according to the switching pattern of arrows F4 and F5 illustrated in FIG. 10 each time the push button switch 224 is pressed (S7: Yes).

In step S9, the monitoring processor 17 of the control system 1 monitors whether or not the cutoff lever 350 is operated from the "lowered position" to the "raised position" based on on/off of the cutoff switch 353. When the cutoff switch 353 turns from on to off, the monitoring processor 17 determines that the cutoff lever 350 is operated to the "raised position" (S9: Yes), and the control system 1 shifts the process to step S2. Meanwhile, if the cutoff switch 353 remains on, the monitoring processor 17 determines that the cutoff lever 350 is in the "enabled state" of being at the "lowered position" (S9: No), and the control system 1 shifts the process to step S7.

The control system 1 repeatedly executes the processes in step S1 to step S9 described above. However, the flowchart illustrated in FIG. 11 is merely an example, and the processes may be added or omitted as appropriate, or the order of the processes may be swapped as appropriate.

[3.4] Other Processes

In the present embodiment, the display mode of the captured images Im11, Im12, and Im13 on the camera screen Dp12 can be further changed by a specific operation of the switching operation unit. Here, the "specific operation" is, as an example, a predetermined operation on the push button switch 224 serving as the switching operation unit, including, for example, "long press", in which the push button switch 224 is pressed and held for a predetermined time, and "two presses", in which the push button switch 224 is pressed twice in succession.

In other words, the display mode of the captured images Im11, Im12, and Im13 is changed not only when the switching operation unit (push button switch 224) is operated to switch between the first camera screen Dp121 and the second camera screen Dp122, but also by the specific operation of the switching operation unit. The display modes that are changed in response to the specific operation of the switching operation unit are, for example, illustrated in FIGS. 12 and 13. In FIG. 13, only the second region R2 of the camera screen Dp12 is illustrated, and regions other than the second region R2 are omitted.

Figure 12:
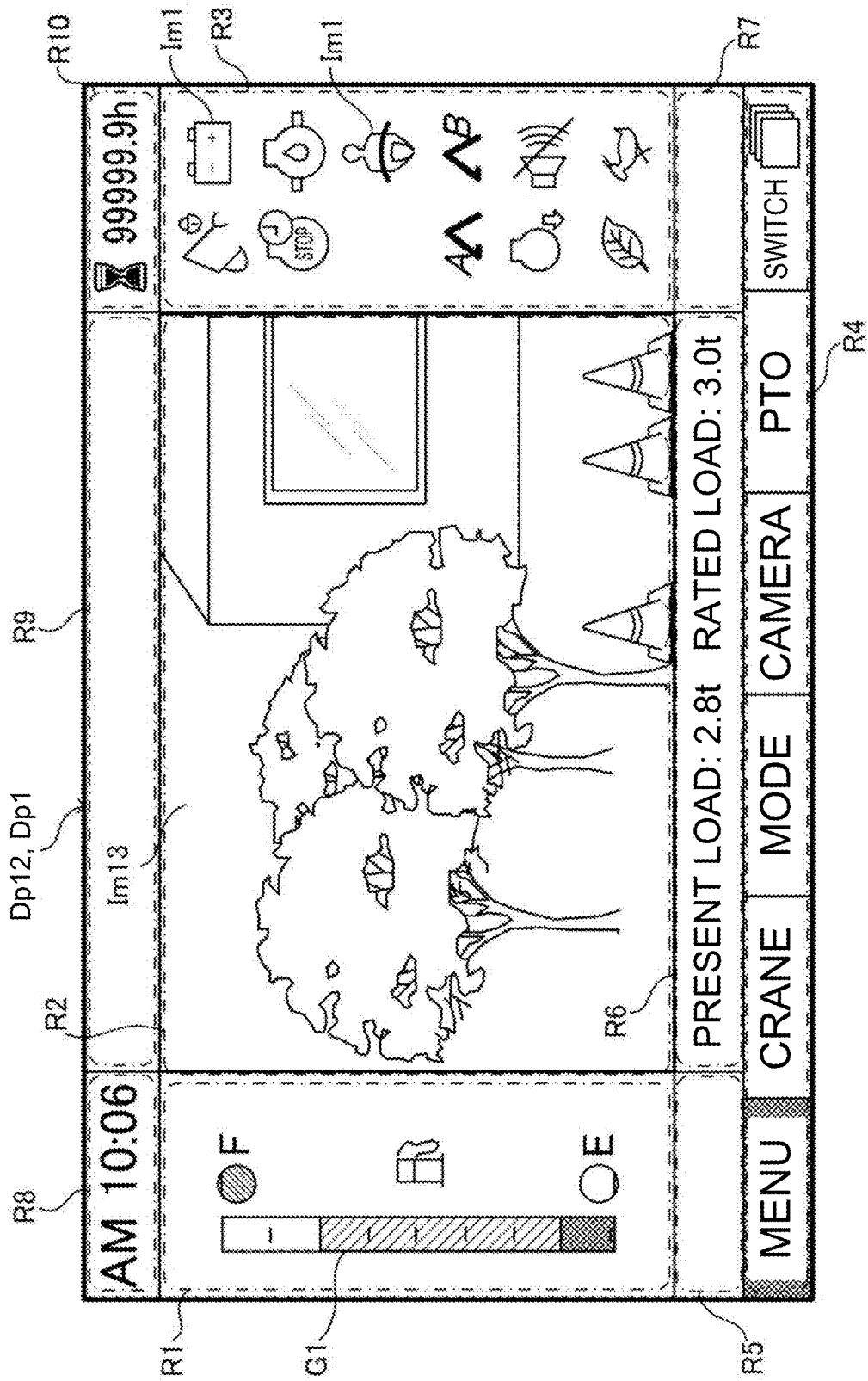
FIG. 12 is a diagram illustrating another display mode of the camera screen displayed by the work machine control system according to the first embodiment.
Figure 13:
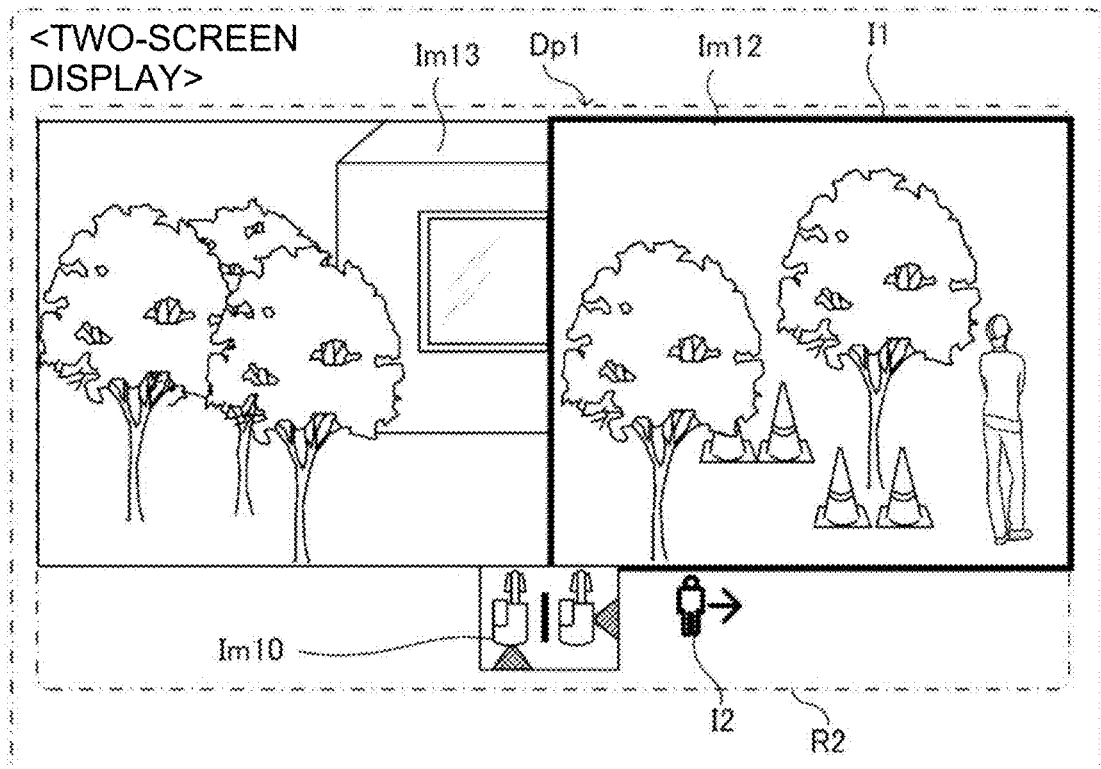
FIG. 13 is a diagram illustrating still another display mode of the camera screen displayed by the work machine control system according to the first embodiment.
Figure 13:
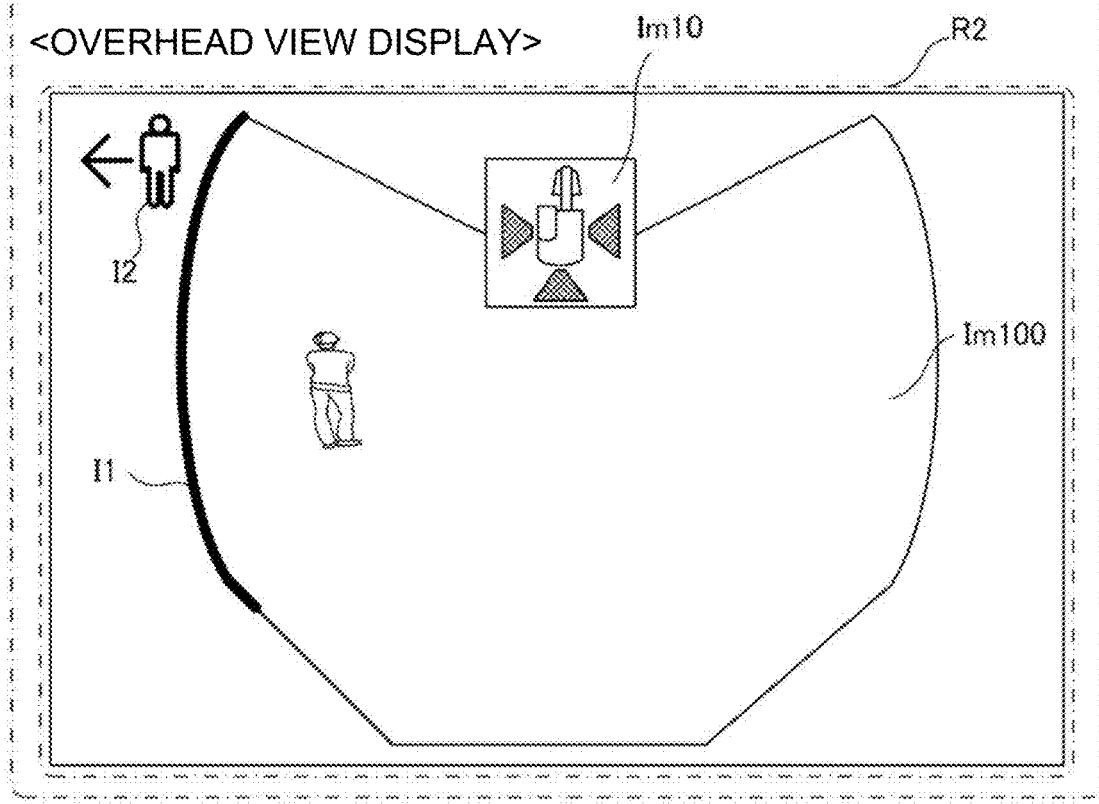

In the example in FIG. 12 (one-screen display), among the captured images Im11, Im12, and Im13 of the monitoring area A1 (see FIG. 6), only the captured image Im13 captured by the rear camera 343 is displayed in the second region R2.

In the upper-step example (two-screen display) in FIG. 13, the second region R2 displays two screens, that is, among captured images Im11, Im12, and Im13 (see FIG. 6), the captured image Im12 captured by the right camera 342 and the captured image Im13 captured by the rear camera 343. In this example, the captured images Im12 and Im13 are placed side by side in the left-right direction in the second region R2, and an icon Im10 is displayed below the captured images Im12 and Im13. The icon Im10 schematically illustrates a positional relationship between the imaging ranges (small areas A12 and A13) of the right camera 342 and the rear camera 343 as seen from the machine body 30.

In the lower-step example (overhead view display) of FIG. 13, an overhead image Im100 of the monitoring area A1 is displayed in the second region R2. The overhead image Im100 is a type of captured image generated by performing coordinate transform on the captured images Im11, Im12, and Im13 of the left camera 341, the right camera 342, and the rear camera 343, respectively, and combining the captured images Im11, Im12, and Im13. Even in this overhead image Im100, the detection object I1 is a band-shaped (frame-shaped) graphic image displaying a small area where the detection target Ob1 is present in an emphasized manner. The overhead image Im100 may be obtained by compositing captured images into an animation.

Each time the specific operation (e.g., "long press") is performed on the push button switch 224 serving as the switching operation unit, the switching processor 13 switches the display mode of the captured image of the second region R2 in the camera screen Dp12 (first camera screen Dp121 and second camera screen Dp122) in the order of the above-mentioned three-screen display (see FIG. 6), one-screen display, two-screen display, and overhead view display. This allows the user to select any desired display mode of the captured images thereby improving the visibility of the captured images.

As yet another function, in the control method according to the present embodiment, when the disabling operation unit is operated while a different screen that is not the basic screen Dp11 and the camera screen Dp12 is displayed on the display device 2, at least one of the first switching process and the second switching process corresponding to the operation is executed after the display of the different screen is finished.

Figure 14:
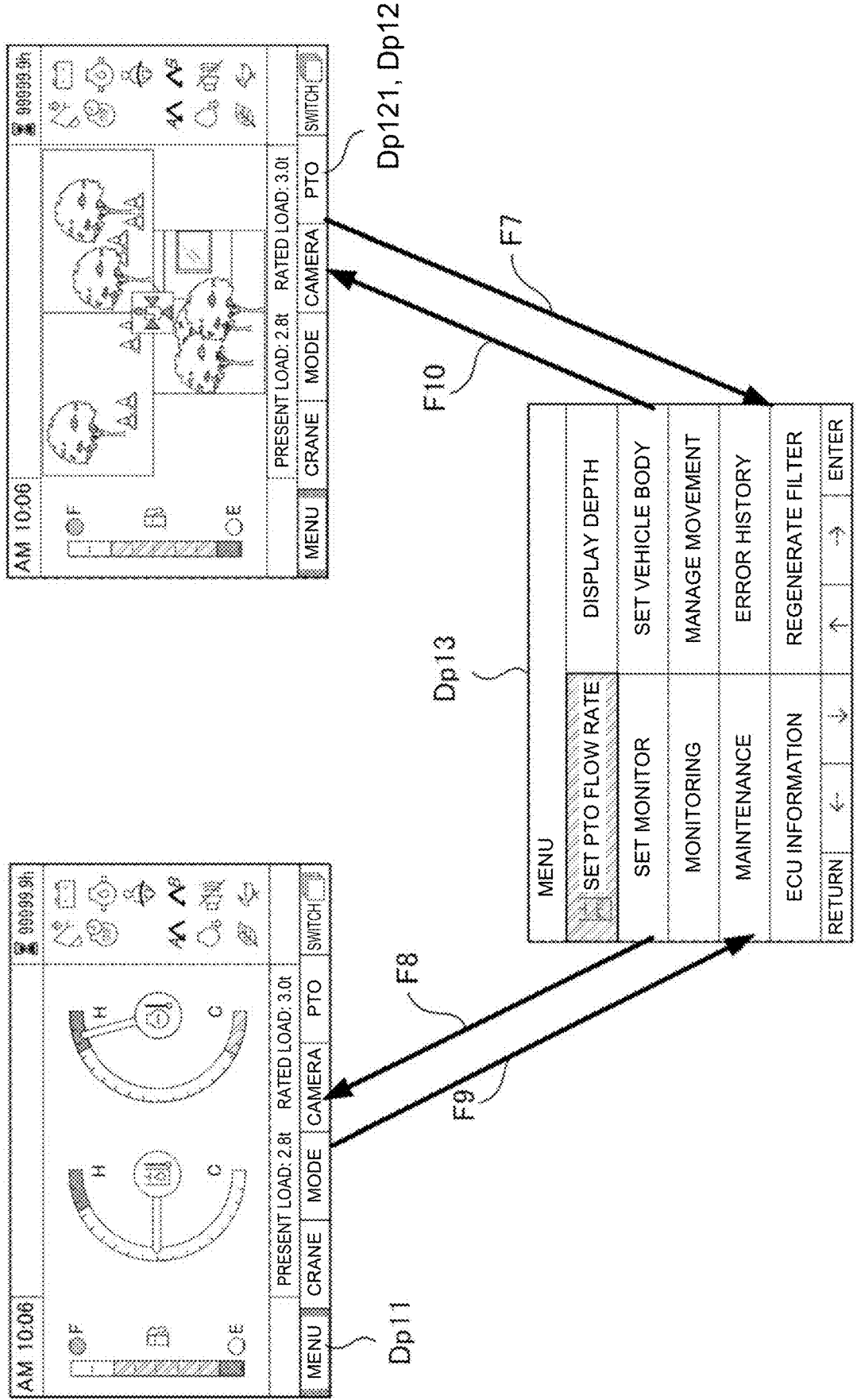
FIG. 14 is a diagram illustrating a switching process of the display screen displayed by the work machine control system according to the first embodiment.

For example, when the cutoff lever 350 serving as the disabling operation unit is operated to the "raised position", the display screen Dp1 is switched from the camera screen Dp12 to the basic screen Dp11 by the first switching process. However, at the timing when the cutoff lever 350 is operated, if the display screen Dp1 is a different screen, such as the menu screen Dp13, the display screen Dp1 is not immediately switched. In this case, after the display of the different screen (menu screen Dp13) is finished, the display screen Dp1 is switched to the basic screen Dp11 by the first switching process that is accompanied by the cutoff lever 350 being operated to the "raised position". Therefore, in this case, the display screen Dp1 switches in the order of the first camera screen Dp121, the menu screen Dp13, and the basic screen Dp11, as illustrated in FIG. 14 (arrows F7 and F8). In other words, in the first switching process, the display screen Dp1 switches from the camera screen Dp12, via the different screen (herein, the menu screen Dp13), to the basic screen Dp11.

Similarly, when the cutoff lever 350 serving as the disabling operation unit is operated to the "lowered position", the display screen Dp1 is switched from the basic screen Dp11 to the camera screen Dp12 by the second switching process. However, at the timing when the cutoff lever 350 is operated, if the display screen Dp1 is a different screen, such as the menu screen Dp13, the display screen Dp1 is not immediately switched. In this case, after the display of the different screen (menu screen Dp13) is finished, the display screen Dp1 is switched to the camera screen Dp12 by the second switching process that is accompanied by the cutoff lever 350 being operated to the "lowered position". Therefore, in this case, the display screen Dp1 switches in the order of the basic screen Dp11, the menu screen Dp13, and the first camera screen Dp121, as illustrated in FIG. 14 (arrows F9 and F10). In other words, in the second switching process, the display screen Dp1 is switched from the basic screen Dp11, via the different screen (herein, the menu screen Dp13), to the camera screen Dp12.

Thus, while a different screen is being displayed, priority is given to displaying the different screen, and after the display of the different screen is finished, the display screen Dp1 is switched by the first switching process or the second switching process according to the operation state of the cutoff lever 350 serving as the disabling operation unit. Therefore, the reduction in usability due to the display screen Dp1 being switched unexpectedly while a different screen is being displayed can be suppressed.

Here, in the control method according to the present embodiment, when a return condition is satisfied while a different screen is being displayed, the display screen Dp1 to be displayed on the display device 2 is switched from the different screen to the basic screen Dp11 or the camera screen Dp12. In other words, the display of the different screen such as the menu screen Dp13 as described above is finished when the return condition is satisfied. This facilitates switching from the different screen to the basic screen Dp11 or the camera screen Dp12.

In the present embodiment, the return condition includes that a return time elapses from starting the display of the different screen. In other words, after a return time of, for example, about one minute has elapsed from starting the display of the different screen such as the menu screen Dp13, the return condition is satisfied and the display of the different screen is automatically finished. This facilitates switching from the different screen to the basic screen Dp11 or the camera screen Dp12. However, the return condition is not limited to the return time, but may be, for example, an operation of the operation unit 22.

[4] Modified Examples

Hereinafter, the modified examples of the first embodiment will be described. The modified examples described below can be applied in combination as appropriate.

The control system 1 according to the present disclosure includes a computer system. The computer system includes, as main components, one or more processors and one or more storages as hardware. The processor, by executing the program recorded in the storage of the computer system, realizes the function as the control system 1 in the present disclosure. The program may be preliminarily recorded in the storage of the computer system, may be provided through an electric communication line, or may be provided in a manner to be recorded in a non-transitory recording medium, such as a memory card, an optical disk, a hard disk drive, or the like, each of which is readable by the computer system. Furthermore, some of or all the functional units included in the control system 1 may be configured by an electronic circuit.

A configuration in which at least a part of the functions of the control system 1 is integrated in one housing is not essential for the control system 1, and the components of the control system 1 may be provided in a plurality of housings in a distributed manner. Conversely, in the first embodiment, functions that are distributed to a plurality of devices (for example, the control system 1 and the display device 2) be integrated in one housing. Furthermore, at least a part of the functions of the control system 1 may be realized by a cloud (cloud computing) or the like.

Further, the power source of the work machine 3 is not limited to a diesel engine, but may be, for example, an engine other than the diesel engine, a motor (electric motor), or a hybrid power source that includes the engine and the motor (electric motor).

Further, the display device 2 is not limited to a dedicated device, but may be a general-purpose terminal such as a laptop computer, a tablet terminal, or a smartphone. Further, the display unit 23 is not limited to a mode that directly displays a display screen, such as a liquid crystal display or an organic EL display, but may be a configuration that displays the display screen by projection, such as a projector.

Further, as a mode for inputting information of the operation unit 22, a mode other than the push button switch, the touch panel, and the operation dial may be employed. For example, the operation unit 22 may employ any mode such as a keyboard, a pointing device such as mouse, a voice input, a gesture input, or inputting an operation signal from another terminal.

In particular, the switching operation unit is not limited to the push button switch 224 of the operation unit 22, but may also be an appropriate operation means such as a dedicated mechanical switch, a touch panel, or a voice input, for example. Furthermore, the switching operation unit is not essential to be a single operation switch. The switching operation unit may include a plurality of operation switches.

The restriction process executed by the restriction processor 122 may be any process that restricts a movement of the work machine 3, and is not limited to a process that prohibits (disables) the movement (such as the swivel movement) of the work machine 3. The restriction process may be, for example, a process to reduce a speed of a movement (such as the swivel movement) of the work machine 3, narrow a movement range (such as a swiveling angle) of the work machine 3, or restrict an allowable area of the movement of the work machine 3.

In addition, the function associated with the restraint process by the restraint processor 12 is not an essential function, and the restraint processor 12 can be omitted as appropriate. In this case, the detector 15 can also be omitted. Even in the case that the detector 15 is omitted, the captured images Im11, Im12, and Im13 of the monitoring area A1 captured by the left camera 341, the right camera 342, and the rear camera 343 are displayed on the display screen Dp1 (camera screen Dp12).

Further, the sensors for detecting the detection target Ob1 in the monitoring area A1 around the work machine 3 are not limited to the left camera 341, the right camera 342 and the rear camera 343, but may be one, two, or four or more cameras (image sensors). Furthermore, for example, a camera capable of capturing images in all directions seen from the work machine 3, such as an entire celestial sphere camera (360-degree camera), may be used to detect the detection target Ob1 in the monitoring area A1. The sensors for detecting the detection target Ob1 in the monitoring area A1 may include, in addition to or instead of the cameras, for example, sensors, such as a motion sensor, a sonar sensor, a radar or Light Detection and Ranging (LiDAR). Here, the sensor for detecting the detection target Ob1 in the monitoring area A1 may be a three-dimensional sensor that measures a distance to the detection target Ob1 by a time of flight (TOF) method, which measures a distance to a distance measurement point based on the round trip time taken by light or sound to reach the distance measurement point and return from the distance measurement point.

Further, the detection target Ob1 may include, in addition to or instead of a "person", a mobile object such as a vehicle (including other work machines), a structure such as a wall and a pillar, a plant, an animal, a step, a groove, or other obstacles.

As for the movement mode of the work machine 3, switching between the crane mode and another mode (e.g., excavation mode) may be performed automatically, without an operation by the user (operator), for example, according to a hook storage state with respect to the bucket 331. In other words, the hook is housed in the bucket link so that the hook does not get in the way when performing excavation work, and the like, with the bucket 331. Meanwhile, when performing a lifting work, the user (operator) pulls the hook out from the bucket link. So, for example, the bucket link may be provided with a storage sensor that detects the hook storage state, and the selection processor 16 may be configured to automatically switch the movement mode between the crane mode and the excavation mode upon receiving an output of the storage sensor. In this case, when the user operates the hook to pull the hook out of the bucket link, the selection processor 16 switches the movement mode to the crane mode upon receiving the output of the storage sensor at that time.

It is not essential that the change in switching pattern include a change in the number of a plurality of screens to be switched. It is also not essential that the change in the switching pattern include a change in the screen that is a switching destination. Furthermore, when the movement state is in the first state, it is not essential that the plurality of screens to be switched include a single or a plurality of the camera screens Dp12 and the basic screen Dp11. When the movement state is in the second state, it is also not essential that the plurality of screens to be switched include a plurality of the camera screens Dp12. Here, it is also not essential that the plurality of camera screens Dp12 differ from each other in the display mode of the captured images. It is not essential that the plurality of camera screen Dp12 (the plurality of candidate screens) include the first camera screen Dp121 and the second camera screen Dp122. It is also not essential that the display mode of the captured images can be further changed by the specific operation of the switching operation unit.

It is not essential that the information related to the work machine 3 include at least one of the remaining amount of fuel, the cooling water temperature and the hydraulic oil temperature. It is also not essential that the movement state includes at least one of the following: the operation state of the cutoff lever 350 and whether or not the movement mode of the work machine 3 is the crane mode.

It is also not essential that when the disabling operation unit is operated while the different screen is being displayed, at least one of the first switching process and the second switching process corresponding to the operation is executed after the display of the different screen is finished. Furthermore, it is also not essential that the display screen Dp1 is switched to the basic screen Dp11 or the camera screen Dp12 when the return condition is satisfied while the different screen is being displayed. In addition, it is not essential that the camera screen Dp12 to be displayed on the display device 2 is one of the plurality of candidate screens.

Second Embodiment

The work machine 3 according to the present embodiment differs from the work machine 3 according to the first embodiment in that the switching operation unit is omitted. Hereinafter, the same components as those in the first embodiment will be denoted by the same reference signs, and the description thereof will be properly omitted.

Figure 15:
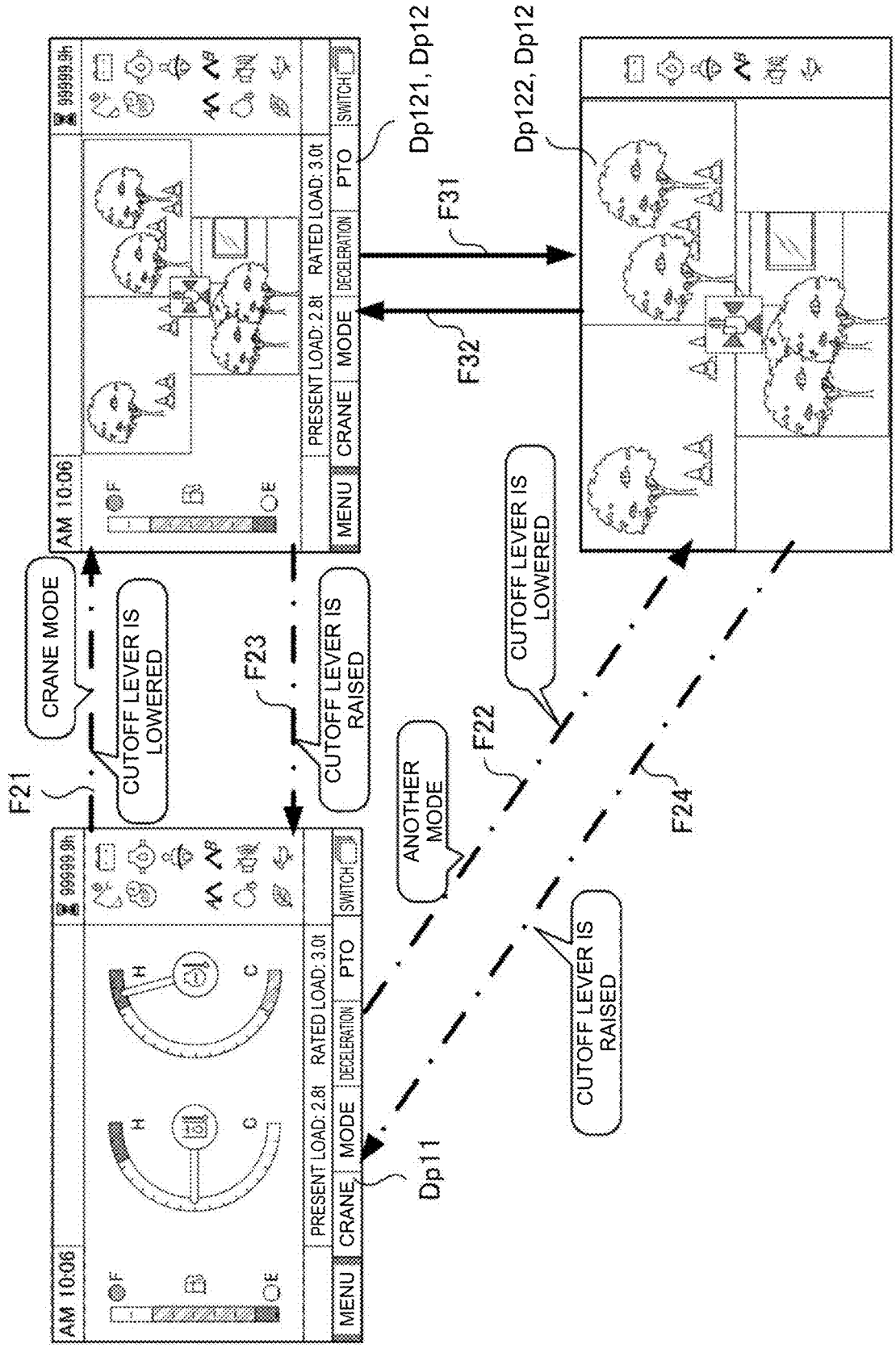
FIG. 15 is a diagram illustrating a switching process of the display screen displayed by the work machine control system according to a second embodiment.

In the present embodiment, the switching processor 13 of the control system 1 basically switches the display screen Dp1 in response to the operation of the cutoff lever 350 serving as the disabling operation unit. In FIG. 15, arrows F21 to F24, shown by dashed-dotted lines, indicate the switching (transition) of the display screen Dp1 when the cutoff lever 350, which is an example of the disabling operation unit, is operated.

First, when the cutoff lever 350 is in the "disabled state" of being at the "raised position", if the cutoff lever 350 is operated to the "lowered position" while the basic screen Dp11 is being displayed, the display screen Dp1 displayed on the display device 2 is switched from the basic screen Dp11 to the camera screen Dp12 (arrows F21 and F22) by the second switching process. At this time, if the movement mode of the work machine 3 is in the crane mode, the display screen Dp1 switches from the basic screen Dp11 to the first camera screen Dp121 (arrow F21). Meanwhile, if the movement mode of the work machine 3 is in another mode other than the crane mode, such as the excavation mode, the display screen Dp1 switches from the basic screen Dp11 to the second camera screen Dp122 (arrow F22).

Thus, in the second switching process, the display screen Dp1 to be displayed on the display device 2 is switched, according to the switching pattern, from the basic screen Dp11 to one candidate screen selected from among a plurality of candidate screens. The "switching pattern" in this case is preferably also changed according to the movement state (e.g., movement mode) of the work machine 3. As a result, it is possible to switch to the camera screen Dp12 that is appropriate at that time, even if the cutoff lever 350 serving as the disabling operation unit is operated in the same way.

On the other hand, when the cutoff lever 350 is in the "enabled state" of being at the "lowered position", if the cutoff lever 350 is operated to the "raised position" while the camera screen Dp12 (first camera screen Dp121 or second camera screen Dp122) is being displayed, the display screen Dp1 displayed on the display device 2 is switched from the camera screen Dp12 to the basic screen Dp11 (arrows F23 and F24) by the first switching process. In this case, the display screen Dp1 switches to the basic screen Dp11, regardless of whether or not the movement mode of the work machine 3 is in the crane mode.

As described above, the display screen Dp1 is switched in response to the operation of the cutoff lever 350 serving as the disabling operation unit, even without the switching operation unit. As a result, the display screen Dp1 automatically switches in conjunction with the operation of the disabling operation unit (cutoff lever 350), which provides the advantage of improved operability, for example, the operator can reach the screen he or she wants to see relatively easily.

Furthermore, in the present embodiment, the switching processor 13 is preferably configured to be capable of switching between the first camera screen Dp121 and the second camera screen Dp122. For example, when a predetermined switching condition is satisfied, the switching processor 13 switches the display screen Dp1 from the first camera screen Dp121 to the second camera screen Dp122, or from the second camera screen Dp122 to the first camera screen Dp121. As an example, when the switching condition, such as returning from the different screen such as the menu screen Dp13 (see FIG. 14), or operation of the work machine 3 is not performed for a certain time, is satisfied, the display screen Dp1 switches from the first camera screen Dp121 to the second camera screen Dp122 (arrow F31). Meanwhile, when the switching condition such as a specific operation is performed on the operation unit 22 or the like while the second camera screen Dp122 is displayed, the display screen Dp1 switches from the second camera screen Dp122 to the first camera screen Dp121 (arrow F32).

The configuration of the second embodiment can be employed in combination with the various configurations (including the modifications) described in the first embodiment as necessary.

APPENDICES TO THE INVENTION

Appended below is a summary of the invention extracted from the embodiments described above. The configurations and processing functions described in the appendices below may be selected and arbitrarily combined.

Appendix 1

A work machine control method comprising: displaying a display screen including information related to a work machine, on a display device; switching, when a switching operation unit is operated, the display screen to be displayed on the display device, among a plurality of screens according to a switching pattern; and changing the switching pattern according to a movement state of the work machine.

Appendix 2

The work machine control method according to Appendix 1, wherein the changing the switching pattern includes changing the number of the plurality of screens to be switched.

Appendix 3

The work machine control method according to Appendix 1 or 2, wherein the changing the switching pattern includes changing the screen that is a switching destination.

Appendix 4

The work machine control method according to any one of Appendices 1 to 3, wherein when the movement state is in a first state, the plurality of screens to be switched include a single or a plurality of camera screens which each include a captured image of a monitoring area around the work machine and a basic screen which does not include the captured image.

Appendix 5

The work machine control method according to any one of Appendices 1 to 4, wherein when the movement state is in a second state, the plurality of screens to be switched include a plurality of camera screens which each include a captured image of a monitoring area around the work machine.

Appendix 6

The work machine control method according to Appendix 4 or 5, wherein the plurality of camera screens differ from each other in a display mode of the captured image.

Appendix 7

The work machine control method according to any one of Appendices 4 to 6, wherein the plurality of camera screens include a first camera screen that includes, in addition to the captured image, operating information on an operating state of the work machine, and a second camera screen that does not include the operating information.

Appendix 8

The work machine control method according to any one of Appendices 4 to 7, wherein the display mode of the captured image is further changeable by a specific operation of the switching operation unit.

Appendix 9

The work machine control method according to any one of Appendices 1 to 8, wherein the switching operation unit is a single operation switch.

Appendix 10

The work machine control method according to any one of Appendices 1 to 9, wherein the information related to the work machine includes at least one of a remaining amount of fuel, a cooling water temperature, and a hydraulic oil temperature.

Appendix 11

The work machine control method according to any one of Appendices 1 to 10, wherein the movement state includes at least one of an operation state of a cutoff lever and whether or not a movement mode of the work machine is a crane mode.

Appendix 12

A work machine control program that causes one or more processors to execute the work machine control method according to any one of Appendices 1 to 11.

REFERENCE SIGNS LIST

1: Work machine control system
2: Display device

3: Work machine
11: Display processor
13: Switching processor
Machine body
224: Push button switch (switching operation unit)
350: Cutoff lever
A1: Monitoring area
Dp1: Display screen
Dp11: Basic Screen
Dp12: Camera Screen
Dp121: First camera screen
Dp122: Second camera screen
G1: Remaining amount information (operating information)
G4: Work machine information (operating information)
Im11, Im12, Im13: Captured image
Im100: Overhead image (captured image)

The invention claimed is:

1. A work machine control method comprising:
   displaying a display screen including information related to a work machine, on a display device;
   switching, when a switching operation unit is operated, the display screen to be displayed on the display device, among a plurality of screens according to a switching pattern; and
   changing the switching pattern according to a movement state based, at least in part, on an operation state of a cutoff lever of the work machine, wherein
      when the movement state is a disabled state, the switching operation unit initiates a display of a captured image of the monitoring area around the work machine on the display screen, and
      when the movement state is an enabled state, the display of the captured image of the monitoring area around the work machine on the display screen is maintained without regard to further operation of the switching operation unit.

2. The work machine control method according to claim 1, wherein
   the changing the switching pattern includes changing the number of the plurality of screens to be switched.

3. The work machine control method according to claim 1, wherein
   the changing the switching pattern includes changing the screen that is a switching destination.

4. The work machine control method according to claim 1, wherein
   when the movement state is in a first the disabled state, the plurality of screens to be switched include a single or a plurality of camera screens which each include a captured image of a monitoring area around the work machine and a basic screen which does not include the captured image.

5. The work machine control method according to claim 4, wherein
   the plurality of camera screens differ from each other in a display mode of the captured image.

6. The work machine control method according to claim 4, wherein
   the plurality of camera screens include a first camera screen that includes, in addition to the captured image, operating information on an operating state of the work machine, and a second camera screen that does not include the operating information.

7. The work machine control method according to claim 4, wherein
   in the disabled mode, the display mode of the captured image is further changeable by a specific operation of the switching operation unit.

8. The work machine control method according to claim 1, wherein
   when the movement state is in the enabled state, the plurality of screens to be switched include a plurality of camera screens which each include a captured image of a monitoring area around the work machine.

9. The work machine control method according to claim 1, wherein
   the switching operation unit is a single operation switch.

10. The work machine control method according to claim 1, wherein
    the information related to the work machine includes at least one of a remaining amount of fuel, a cooling water temperature, and a hydraulic oil temperature.

11. The work machine control method according to claim 1, wherein
    the movement state is based further on whether a movement mode of the work machine is a crane mode.

12. A work machine control system comprising:
    a display processor that displays a display screen including information related to a work machine, on a display device; and
    a switching processor that switches, when a switching operation unit is operated, the display screen to be displayed on the display device, among a plurality of screens according to a switching pattern,
    wherein the switching processor changes the switching pattern according to a movement state of the work machine.

13. A work machine comprising:
    the work machine control system according to claim 12; and
    a machine body on which the display device is installed.

* * * * *